United States Patent
Avadhanula et al.

(10) Patent No.: US 9,513,880 B2
(45) Date of Patent: *Dec. 6, 2016

(54) GRAPHICAL FUNCTION SPECIALIZATION

(71) Applicant: The MathWorks, Inc., Natick, MA (US)

(72) Inventors: Srinath Avadhanula, Sudbury, MA (US); Pieter J. Mosterman, Framingham, MA (US); Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,035

(22) Filed: May 23, 2014

(65) Prior Publication Data

US 2014/0359569 A1 Dec. 4, 2014

Related U.S. Application Data

(60) Provisional application No. 61/827,863, filed on May 28, 2013.

(51) Int. Cl.
*G06F 9/44* (2006.01)
*G06F 9/45* (2006.01)

(52) U.S. Cl.
CPC . *G06F 8/35* (2013.01); *G06F 8/10* (2013.01); *G06F 8/34* (2013.01); *G06F 8/51* (2013.01); *G06F 9/4425* (2013.01)

(58) Field of Classification Search
None
See application file for complete search history.

(56) References Cited

U.S. PATENT DOCUMENTS 5,313,574 A * 5/1994 Beethe .................... 715/763
5,497,500 A * 3/1996 Rogers ............... G06F 3/0481
714/E11.217

(Continued)

FOREIGN PATENT DOCUMENTS

WO WO 2007/027622 3/2007

OTHER PUBLICATIONS

Shure, Loren. "MATLAB Release 2009b—Best New Feature or ~?" Sep. 11, 2009. Retrieved from http://blogs.mathworks.com/loren/2009/09/11/matlab-release-2009b-best-new-feature-or/ on Jun. 24, 2015. pp. 1 and 2.*

(Continued)

*Primary Examiner* — Emerson Puente
*Assistant Examiner* — Erika Kretzmer
(74) *Attorney, Agent, or Firm* — Harrity & Harrity, LLP

(57) ABSTRACT

A device receives a state chart generated via a technical computing environment. The state chart includes a function block that includes a function that includes function input(s)/output(s). The state chart includes a state block that includes a function call to the function of the function block. The function call includes call input(s)/output(s). The device initiates execution of the state chart, parses the function into the function input(s)/output(s), and parses the function call into the call input(s)/output(s). The device processes, during the execution of the state chart, the function input(s)/output(s) with a graphical engine of the technical computing environment to generate function-related code. The device processes, during the execution of the state chart, the call input(s)/output(s) with a textual engine of the technical computing environment to generate function call-related code, and provides the function-related code and the function call-related code in generated code.

20 Claims, 21 Drawing Sheets

(56) References Cited

U.S. PATENT DOCUMENTS

| | | | | |
|---|---|---|---|---|
| 5,821,934 | A * | 10/1998 | Kodosky | G06F 3/04847 703/15 |
| 6,282,699 | B1 | 8/2001 | Zhang et al. | |
| 7,020,850 | B2 * | 3/2006 | Raghavan | G06F 8/34 703/23 |
| 7,200,843 | B2 * | 4/2007 | Shann | G06F 8/54 717/162 |
| 7,487,076 | B2 * | 2/2009 | Szpak | G06F 17/5009 703/14 |
| 7,801,715 | B2 * | 9/2010 | Ciolfi | G06F 17/5009 703/13 |
| 7,809,545 | B2 * | 10/2010 | Ciolfi | G06F 8/34 703/22 |
| 7,810,077 | B2 * | 10/2010 | Bracha | 717/131 |
| 7,823,121 | B1 * | 10/2010 | Zarrinkoub | G06F 8/34 715/763 |
| 7,941,303 | B1 | 5/2011 | Raghavan et al. | |
| 8,234,630 | B2 * | 7/2012 | Raghavan et al. | 717/125 |
| 8,271,943 | B2 * | 9/2012 | Hudson, III | G06F 8/34 717/113 |
| 8,423,981 | B2 * | 4/2013 | Hudson, III | G06F 8/34 717/114 |
| 8,655,636 | B2 * | 2/2014 | Kumar | G06F 9/444 703/13 |
| 8,793,602 | B2 * | 7/2014 | Szpak | G06F 9/542 345/173 |
| 8,943,466 | B2 * | 1/2015 | Bray | 717/106 |
| 2002/0170041 | A1 * | 11/2002 | Shann | G06F 8/54 717/141 |
| 2003/0046658 | A1 * | 3/2003 | Raghavan | G06F 8/34 717/106 |
| 2005/0096894 | A1 * | 5/2005 | Szpak | G06F 17/5009 703/13 |
| 2005/0160397 | A1 | 7/2005 | Szpak et al. | |
| 2005/0216248 | A1 * | 9/2005 | Ciolfi | G06F 17/5009 703/22 |
| 2006/0139587 | A1 * | 6/2006 | Rossing | G03F 7/70483 355/53 |
| 2007/0067761 | A1 * | 3/2007 | Ogilvie | G06F 8/34 717/146 |
| 2007/0261019 | A1 * | 11/2007 | Raghavan et al. | 717/105 |
| 2008/0022259 | A1 * | 1/2008 | MacKlem | G06F 8/34 717/113 |
| 2008/0022264 | A1 * | 1/2008 | Macklem | G06F 8/34 717/136 |
| 2008/0127058 | A1 * | 5/2008 | Bray | 717/106 |
| 2008/0270920 | A1 * | 10/2008 | Hudson | G06F 8/34 715/763 |
| 2009/0327942 | A1 * | 12/2009 | Eldridge | G06F 8/34 715/771 |
| 2010/0325617 | A1 * | 12/2010 | Hudson, III | G06F 8/34 717/140 |
| 2011/0320178 | A1 * | 12/2011 | Kumar | G06F 9/444 703/2 |
| 2014/0359560 | A1 * | 12/2014 | Avadhanula et al. | 717/105 |
| 2014/0359561 | A1 * | 12/2014 | Avadhanula et al. | 717/105 |
| 2014/0359566 | A1 * | 12/2014 | Avadhanula et al. | 717/109 |
| 2014/0359567 | A1 * | 12/2014 | Avadhanula et al. | 717/109 |
| 2014/0359568 | A1 * | 12/2014 | Avadhanula et al. | 717/109 |
| 2014/0359569 | A1 * | 12/2014 | Avadhanula et al. | 717/109 |
| 2015/0106781 | A1 * | 4/2015 | Adler | G06F 9/4436 717/104 |

OTHER PUBLICATIONS

Notification of Transmittal of the International Search Report and The Written Opinion of the International Searching Authority, or the Declaration corresponding to PCT/US2014/039574, mailed on Nov. 10, 2014, 10 pages.

The MathWorks, "Stateflow® 7, User's Guide", The MathWorks, Inc., Matlab and Simulink, © 1997-2011, 1509 pages.

* cited by examiner

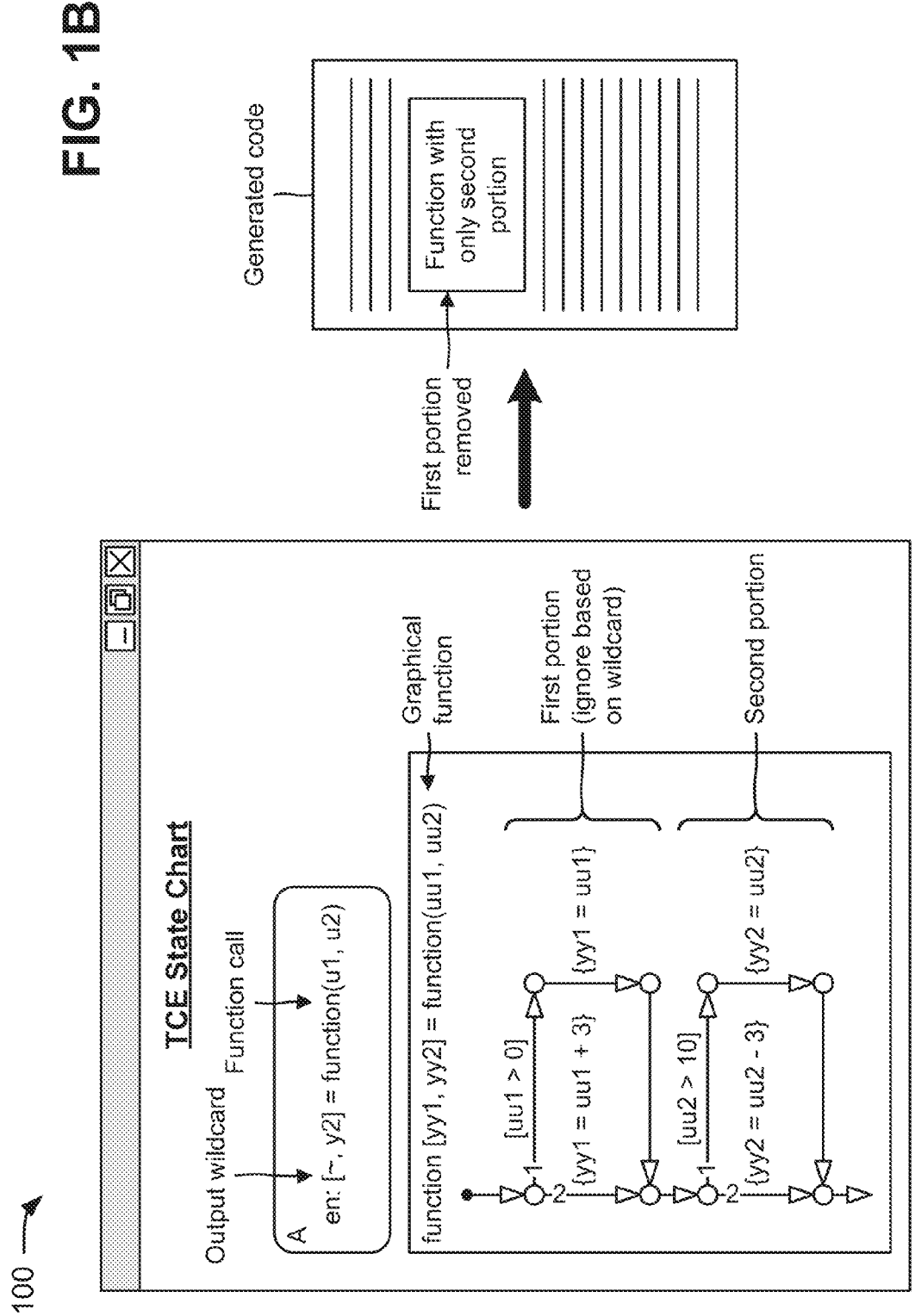

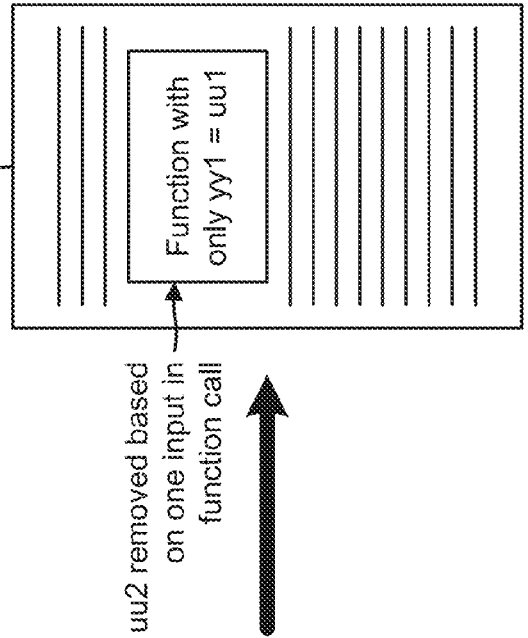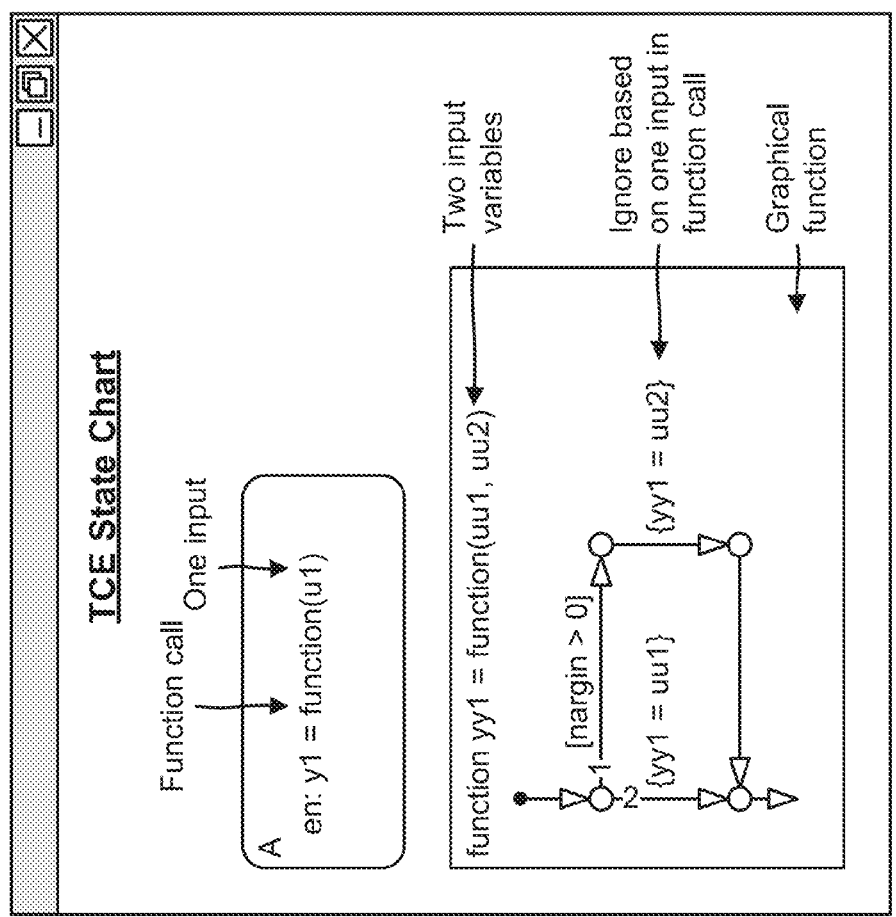
FIG. 1C

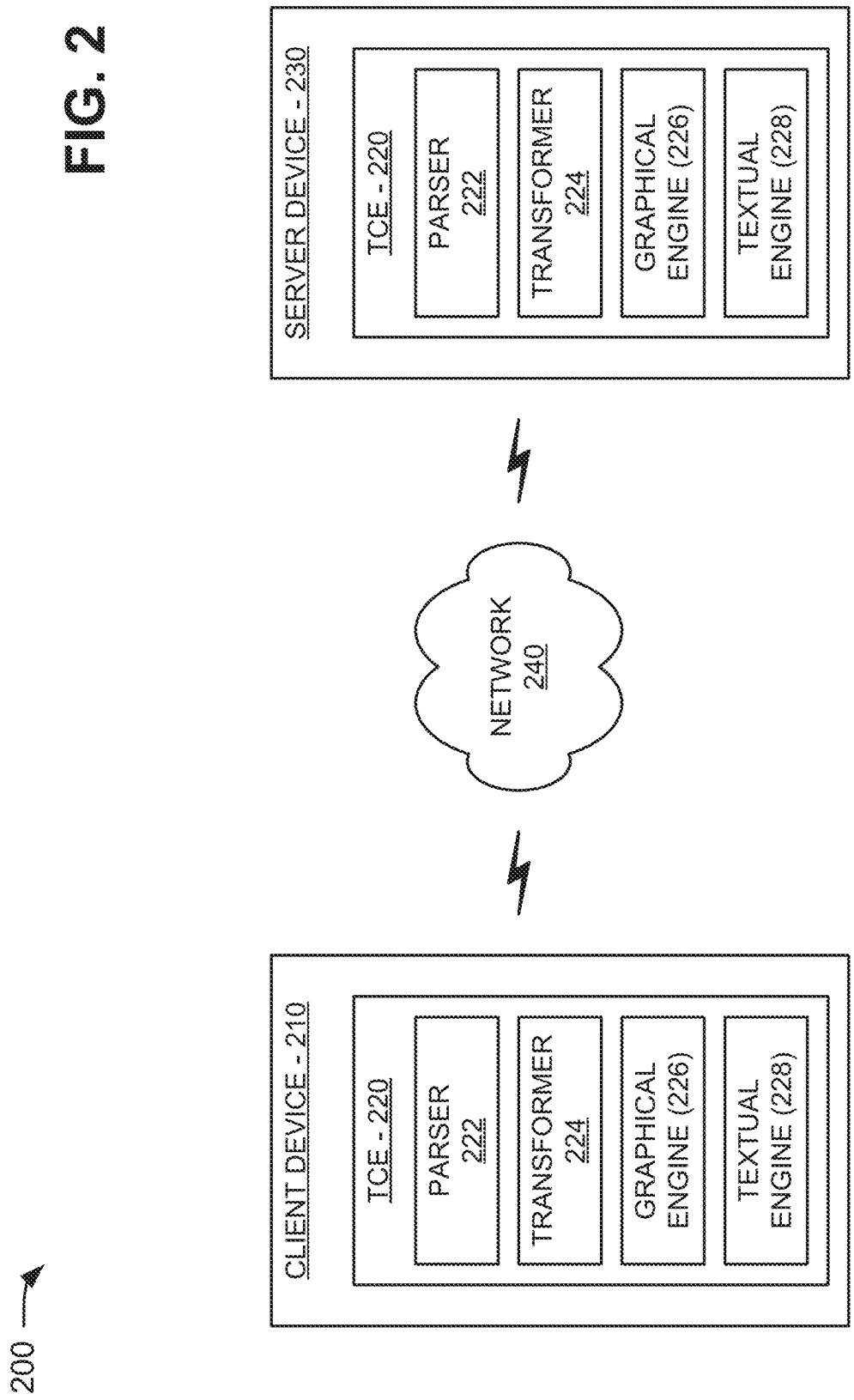

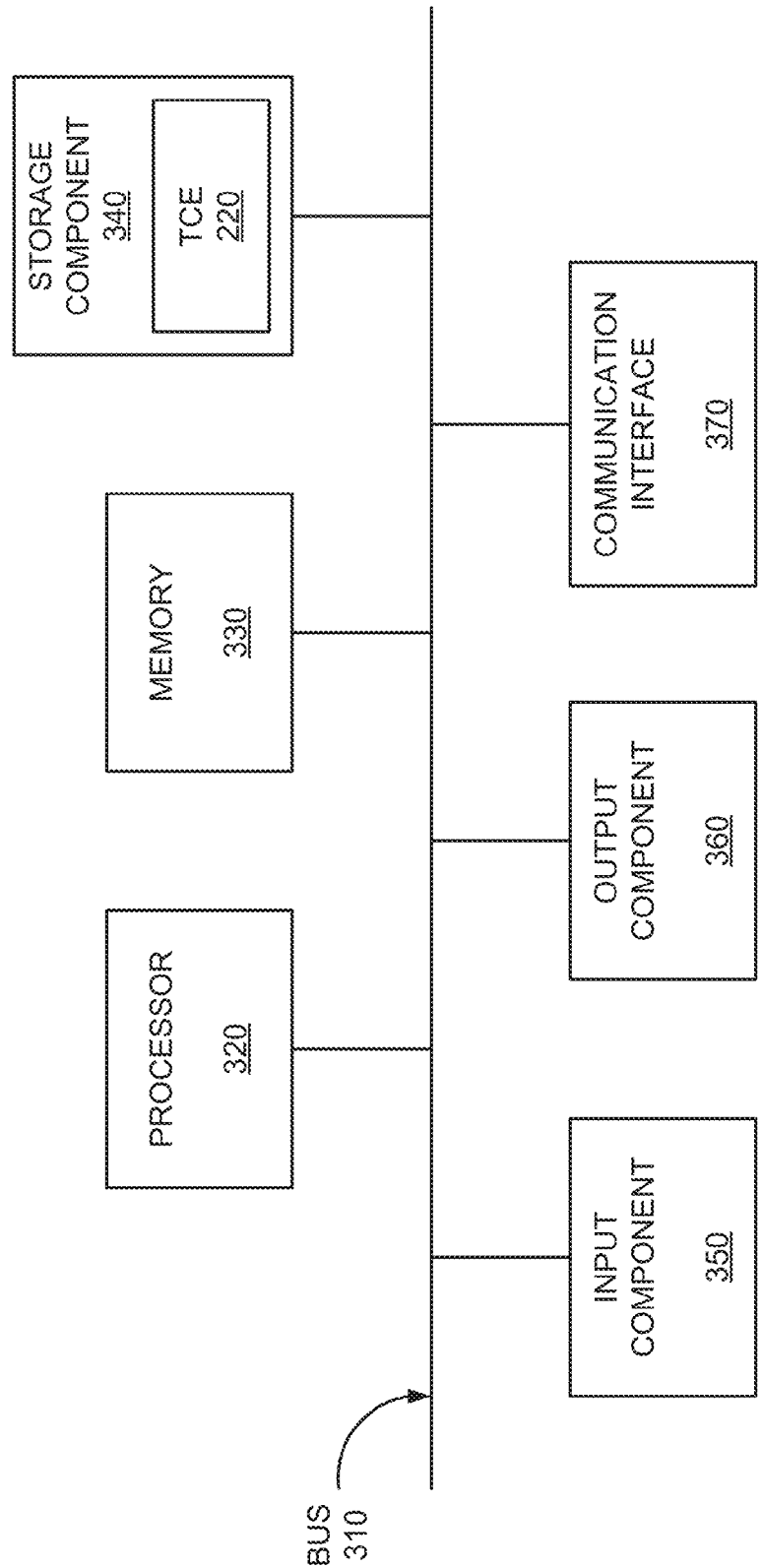

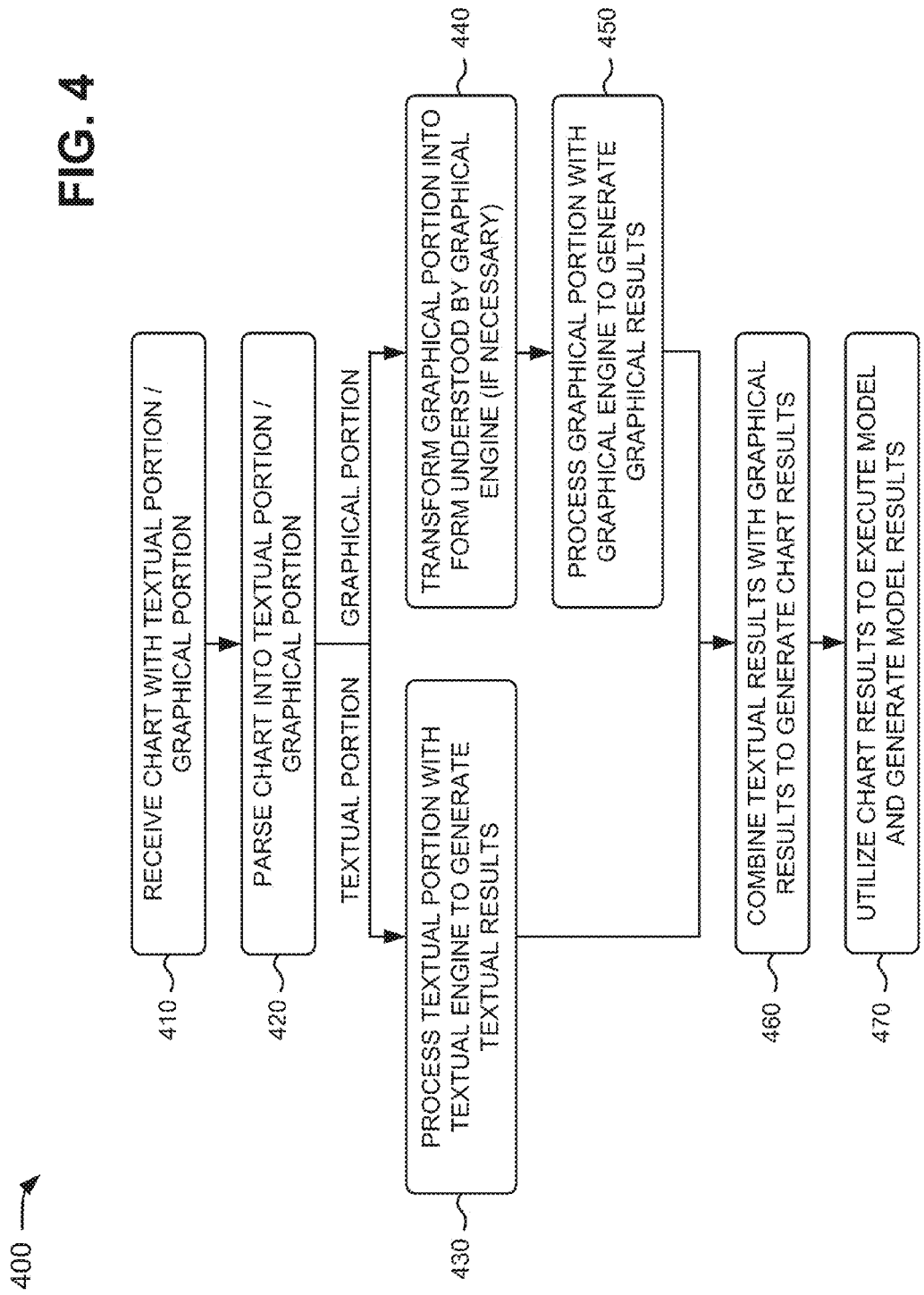

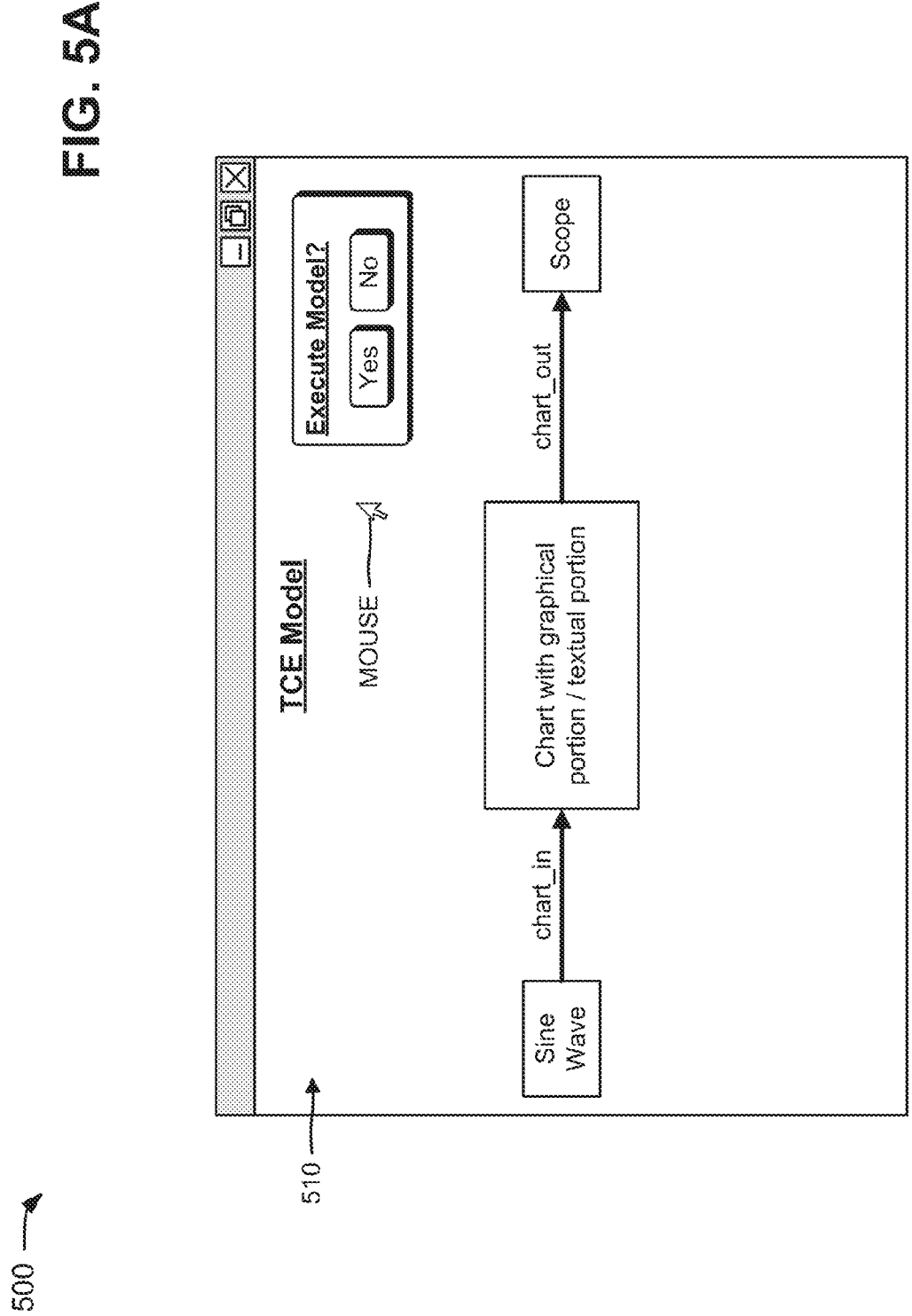

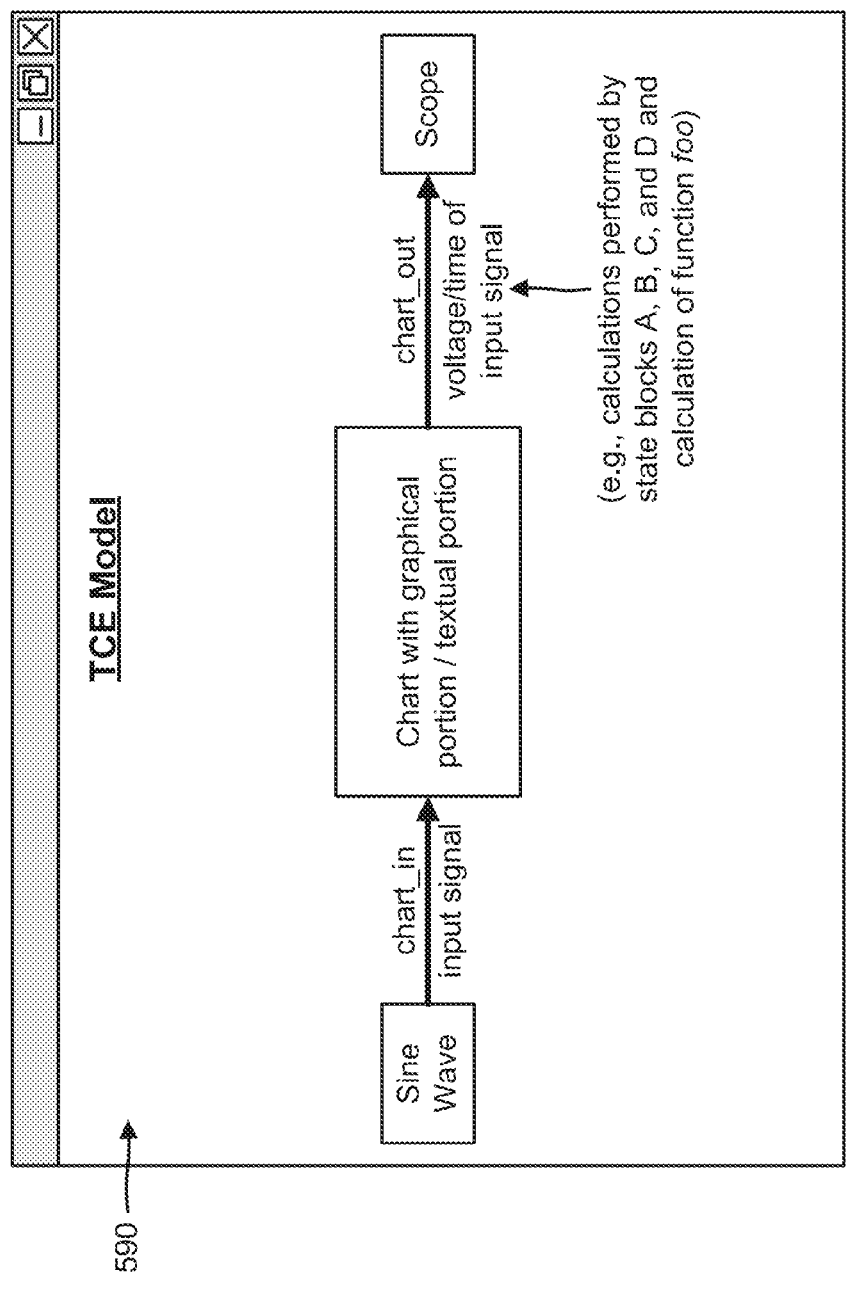

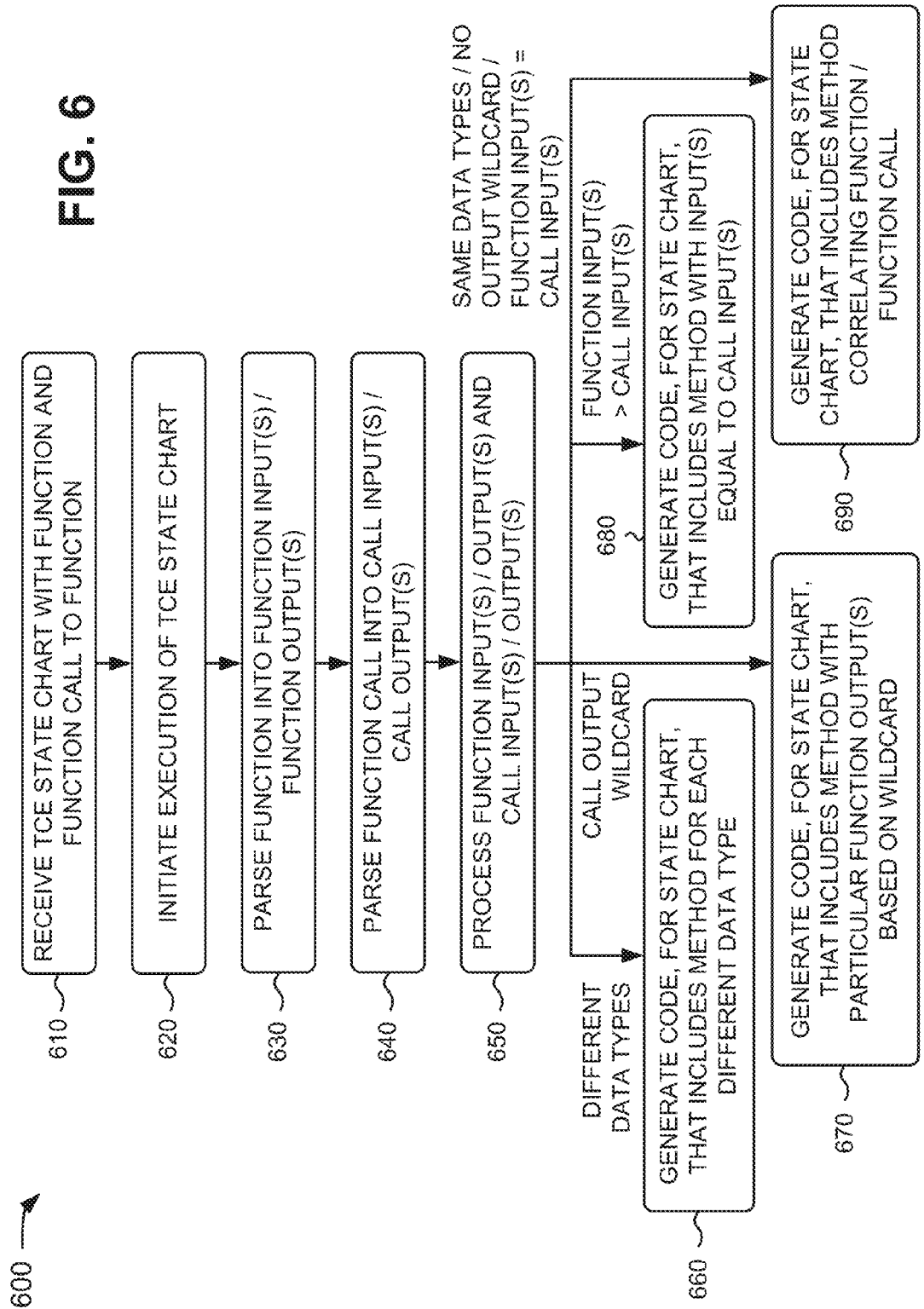

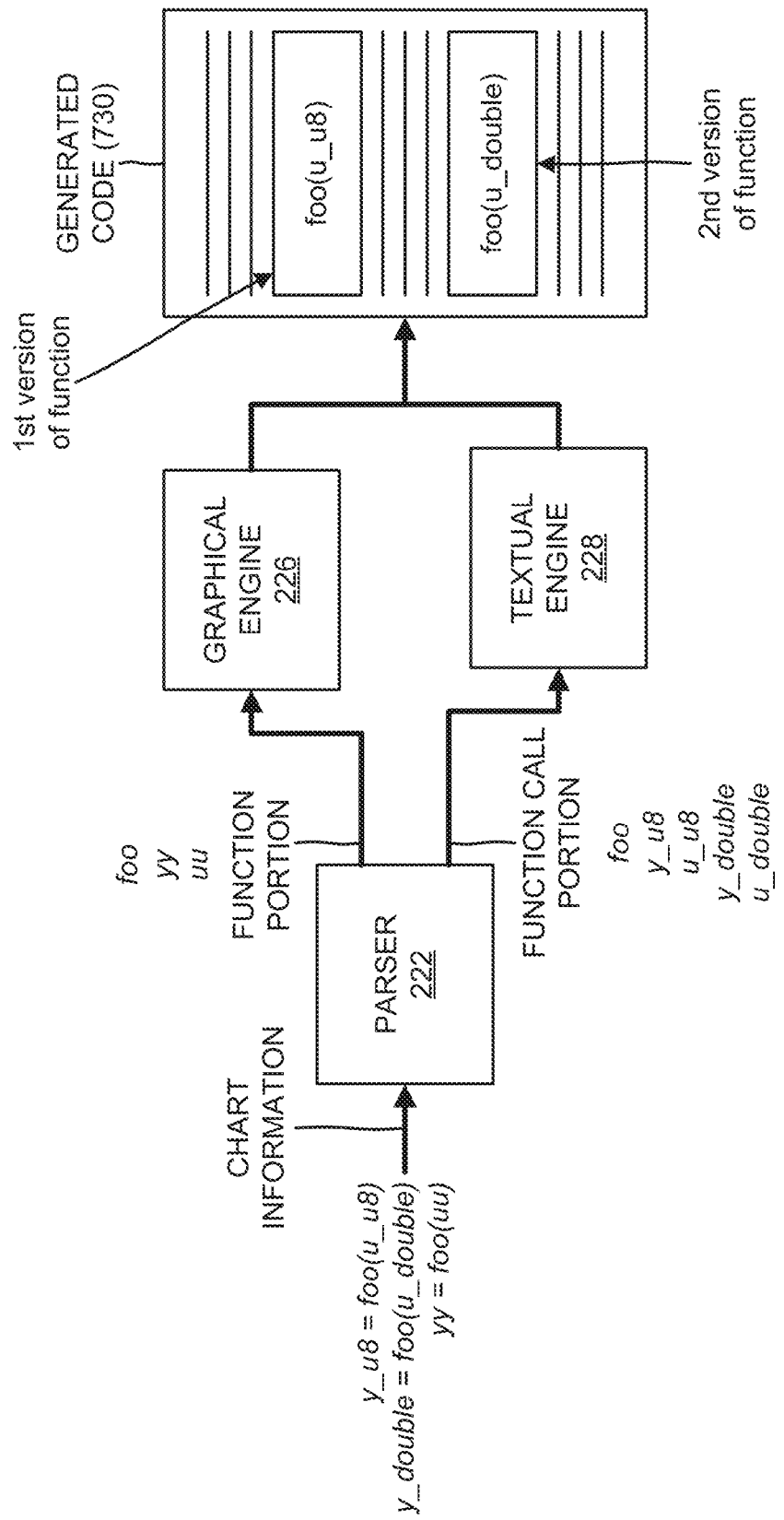

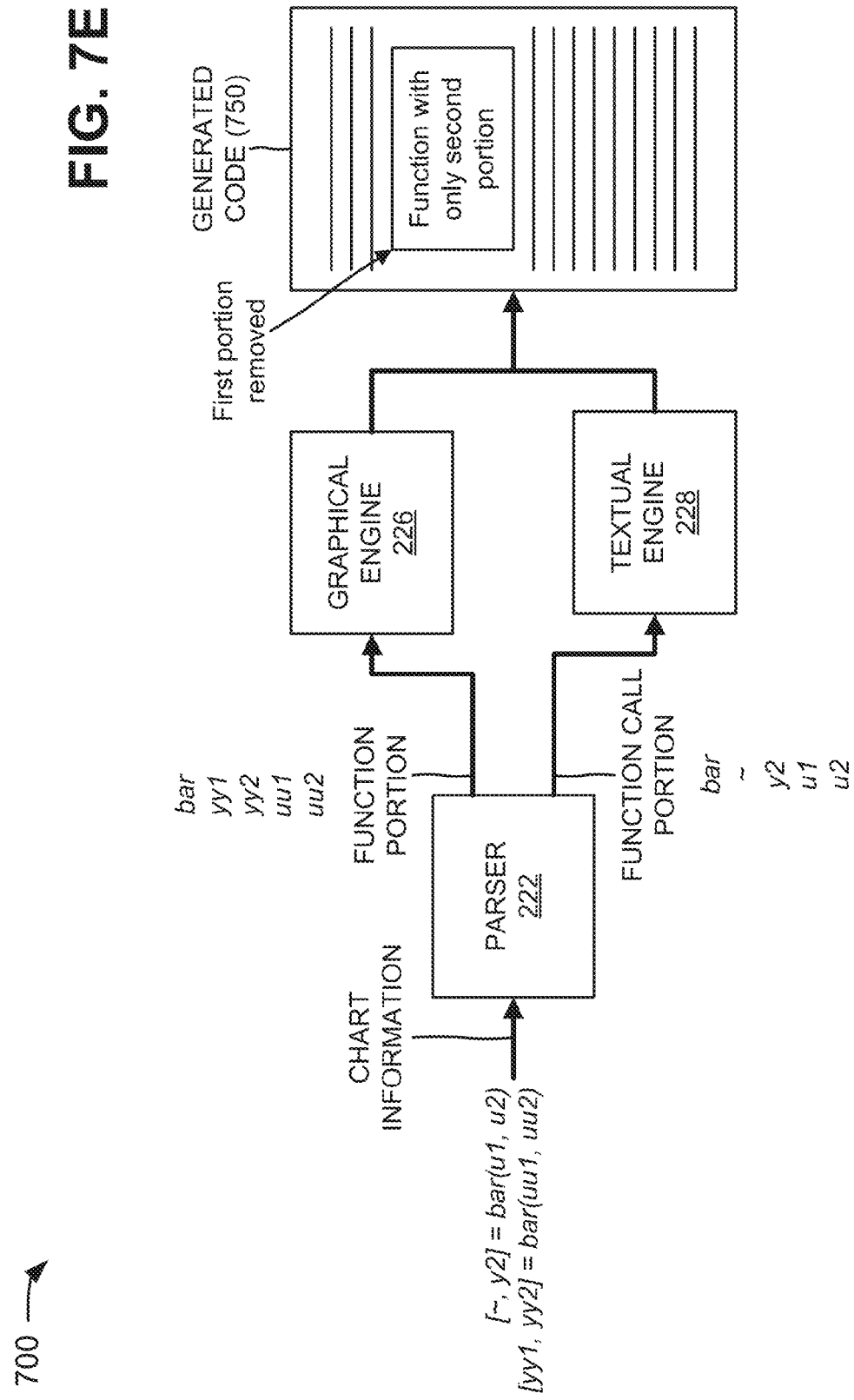

GRAPHICAL FUNCTION SPECIALIZATION

RELATED APPLICATION

This application claims priority under 35 U.S.C. §119 based on U.S. Provisional Patent Application No. 61/827,863, filed May 28, 2013, the disclosure of which is incorporated by reference herein in its entirety.

BRIEF DESCRIPTION OF THE DRAWINGS

FIGS. 1A-1C are diagrams of an overview of an example implementation described herein;

FIG. 2 is a diagram of an example environment in which systems and/or methods described herein may be implemented;

FIG. 3 is a diagram of example components of one or more devices of FIG. 2;

FIG. 4 is a flow chart of an example process for processing textual and graphical portions of a technical computing environment chart;

FIGS. 5A-5E are diagrams of an example relating to the example process shown in FIG. 4;

FIG. 6 is a flow chart of an example process for performing graphical function specialization in a technical computing environment;

FIGS. 7A-7G are diagrams of an example relating to the example process shown in FIG. 6.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

The TCE may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc. The TCE may exist for creating computer-generated models, such as graphical behavioral models, that represent dynamic systems. A model may include a plurality of graphical objects, such as blocks or icons. A model may be executed to simulate the operation or behavior of the system being modeled. Executing the model may be referred to as simulating the model.

The TCE may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment includes an imperative or declarative language with no concept of logical, model, physical, and/or simulation time and events.

Figure 1A:
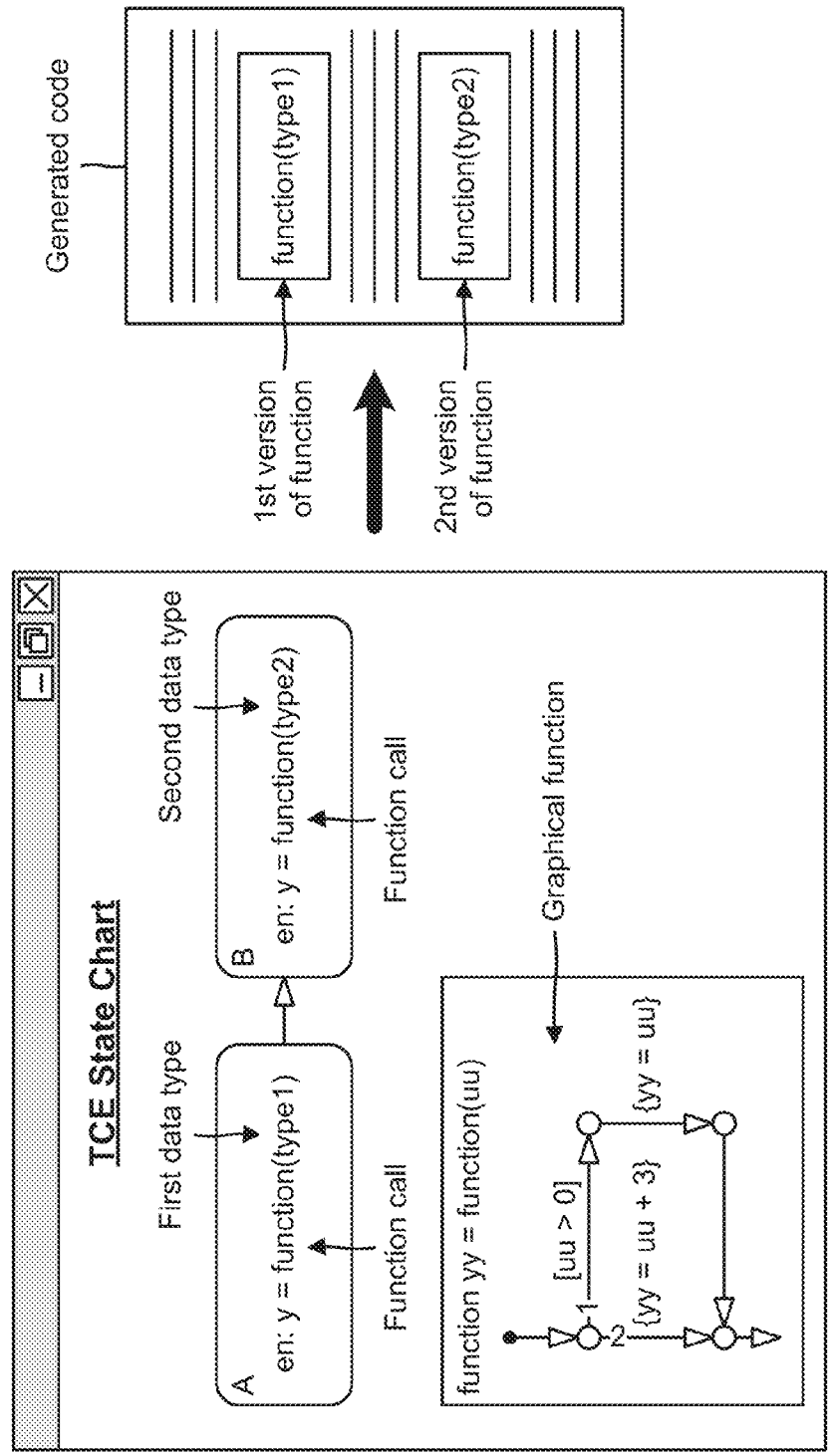

Conventional action languages for the graphical environment (e.g., Stateflow) consisted of statically-typed, scalar-based languages, such as, for example, C, C++, etc. FIGS. 1A-1C are diagrams of an overview of an example implementation 100 described herein. In the example, a textual environment of the TCE may be provided in a graphical environment of the TCE. Time-based and event-based simulation may be introduced into the language of the textual environment, while maintaining the syntax and style of the language. The textual environment may have no concept of time or events without a user explicitly maintaining timers in the textual environment language. The graphical environment may enable a user to create graphical functions that include different input and output types. For example, an input or an output may include a numeric type (e.g., a single precision type, a double precision type, a signed integer type, an unsigned integer type, etc.); a character type (e.g., text strings); a structure type (e.g., a structure array); a cell array type; etc.

As shown below in FIGS. 1A-1C, the graphical environment may be enhanced so that textual code understood by the textual environment may be utilized in graphical functions. A user may leave data types of a graphical function unspecified, and the graphical and textual environments may automatically generate specialized code for different combinations of input and output types of the graphical function. With reference to FIG. 1A, a user may utilize a TCE of a computing device to create a state chart. The state chart may include state block A, state block B, and a graphical function block. State block A may include a representation of a calculation to be performed, and state block B may include a representation of a further calculation to be performed. The graphical function block may include a graphical function that is referenced in state block A and state block B.

As further shown in FIG. 1A, state block A may include textual code (e.g., y=function(type1)) understood by a textual environment of the TCE, and state block B may include textual code (e.g., y=function(type2)) understood by the textual environment of the TCE. The textual code of state block A may include a function call (function), an output variable (y), and an input variable (type1) with a first data type (e.g., a double precision type). The textual code of state block B may include the function call (function), the output variable (y), and an input variable (type2) with a second data type (e.g., an unsigned integer type), different than the first data type. The graphical function block may include textual code (e.g., yy=function(uu)) understood by the graphical environment of the TCE. The textual code of the graphical function block may include an input variable (uu) and an output variable (yy).

After the state chart is created or imported, the user may utilize the computing device to initiate execution of the state chart. During execution of the state chart, the TCE may parse the textual code of the graphical function block into the input variable (uu) and the output variable (yy), and may parse the function call into the input variables (type1 and type2) and the output variable (y). The TCE may process the input and output variables of the graphical function block and the input and output variables of the function call to generate code, as shown in FIG. 1A. For example, the graphical environment of the TCE may process the input and output variables of the graphical function block, and the textual environment of the TCE may process the input and output variables of the function call. The TCE may provide a first version of the function (e.g., function with first data type type1) in a first function of the generated code, and may provide a second version of the function (e.g., function with second data type type2) in a second function of the generated code. The generated code may include code (e.g., C++ code, Hardware Description Language (HDL) code, etc.) that may be utilized by a physical device (e.g., a robot, manufacturing equipment, etc.). The TCE may cause the computing device to embed the generated code in one or more physical devices.

With reference to FIG. 1B, the user may utilize the TCE to create a state chart that includes state block A and a graphical function block. State block A may include a representation of a calculation to be performed, and the graphical function block may include a graphical function that is referenced in state block A. As further shown in FIG. 1B, state block A may include textual code (e.g., [~, y2]=function(u1, u2)) understood by the textual environment of the TCE. The textual code of state block A may include a function call (function), a call output wildcard (e.g., ~), an output variable (y2), and input variables (u1 and u2). The call output wildcard may indicate that the first output variable is optional and may be ignored. The graphical function block may include textual code (e.g., [yy1, yy2]=function(uu1, uu2)) understood by the graphical environment of the TCE. The textual code of the graphical function block may include input variables (uu1 and uu2) and output variables (yy1 and yy2). The graphical function block may also include a first portion associated with output variable yy1, and a second portion associated with output variable yy2.

After the state chart is created or imported, the user may utilize the computing device to initiate execution of the state chart. During execution of the state chart, the TCE may parse the textual code of the graphical function block into the input variables (uu1 and uu2) and the output variables (yy1 and yy2), and may parse the function call into the input variables (u1 and u2), the call output wildcard (e.g., ~), and the output variable (y2). The TCE may process the input and output variables of the graphical function block and the input and output variables of the function call to generate code, as shown in FIG. 1B. For example, the graphical environment of the TCE may process the input and output variables of the graphical function block, and the textual environment of the TCE may process the input and output variables of the function call. When generating the code, the TCE may ignore the first portion of the graphical function since the first portion is associated with the first output variable yy1, which may be ignored based on the call output wildcard. The TCE may provide a version of the function (e.g., function with only the second portion of the graphical function) in a function of the generated code, as further shown in FIG. 1B.

With reference to FIG. 1C, the user may utilize the TCE to create a state chart that includes state block A and a graphical function block. State block A may include a representation of a calculation to be performed, and the graphical function block may include a graphical function that is referenced in state block A. As further shown in FIG. 1C, state block A may include textual code (e.g., y1=function(u1)) understood by the textual environment of the TCE. The textual code of state block A may include a function call (function), an output variable (y1), and an input variable (u1). The graphical function block may include textual code (e.g., yy1=function(uu1, uu2)) understood by the graphical environment of the TCE. The textual code of the graphical function block may include two input variables (uu1 and uu2) and an output variable (yy1).

After the state chart is created or imported, the user may utilize the computing device to initiate execution of the state chart. During execution of the state chart, the TCE may parse the textual code of the graphical function block into the input variables (uu1 and uu2) and the output variable (yy1), and may parse the function call into the input variable (u1) and the output variable (y1). The TCE may process the input and output variables of the graphical function block and the input and output variables of the function call to generate code, as shown in FIG. 1C. For example, the graphical environment of the TCE may process the input and output variables of the graphical function block, and the textual environment of the TCE may process the input and output variables of the function call. When generating the code, the TCE may ignore the second input variable (uu2) of the graphical function block since the function call only includes one input variable (u1). The TCE may provide a version of the function (e.g., function with only the first input variable (uu1) of the graphical function) in a function of the generated code, as further shown in FIG. 1C.

Such an arrangement may provide a user of a TCE with flexibility in defining input and output variables associated with functions and/or function calls. This may provide the user with tools to create a variety of state charts and/or models that include the language of the textual environment.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible, a MATLAB-like language, etc.) that can be used to express problems and/or solutions in mathematical notations. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); and a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32(1, 21)
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

In some implementations, TCE 220 may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc.

In some implementations, TCE 220 may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment may include an assignment-based, imperative language with no concept of logical, model, physical, and/or simulation time and events.

In some implementations, and as further shown in FIG. 2, TCE 220 may include a parser 222, a transformer 224, a graphical engine 226, and a textual engine 228. Parser 222 may include a component that parses TCE code (e.g., a model or a chart) into a graphical portion and a textual portion. The graphical portion may include information associated with a graphical hierarchy, graphical symbols, etc. of the TCE code. The textual portion may include information associated with textual code of the TCE code that may be understood by textual engine 228. In some implementations, parser 222 may parse the textual portion into two or more portions (e.g., a time-based portion and an output portion), and may parse the graphical portion into two or more portions (e.g., a functional portion and a non-functional portion). In some implementations, parser 222 may parse TCE code into other types of portions.

Transformer 224 may include a component that receives the graphical portion of the TCE code that is not understood by graphical engine 226. For example, one or more graphical symbols may not be understood by graphical engine 226 and may be provided to transformer 224. Transformer 224 may transform the received graphical portion into a form that is understood by graphical engine 226.

Graphical engine 226 may receive the transformed graphical portion and the graphical portion that did not need to be transformed, and may process the received information. The processing of the received information may include generating graphical results, such as, for example, how a system reacts to events, time-based conditions, and external input signals. In some implementations, graphical engine 226 may include Simulink® software, Stateflow® software, Simscape™ software, and/or SimEvents® software.

Textual engine 228 may receive the textual portion, and may process the textual portion to generate textual results, such as, for example, data analysis results, matrix calculation results, array calculation results, etc. Graphical engine 226 may combine the graphical results with the textual results to generate combined results that may be understood by the graphical environment and the textual environment. In some implementations, textual engine 228 may include MATLAB software.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for processing textual and graphical portions of a technical computing environment chart. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a chart with a textual portion and a graphical portion (block 410). For example, TCE 220 may enable a user of client device 210 to create a model or to instruct client device 210 to receive the model from another source (e.g., server device 230, a CD-ROM, a flash memory, etc.). In some implementations, the model may include a chart with a graphical hierarchy of one or more chart elements (e.g., areas or regions associated with one or more states, referred to herein as "state blocks"), one or more input signals, and one or more output signals. For example, assume that a chart has state blocks A, B, and C, and that state block A includes state block B and a transition to state block C. An arrangement that includes a state block containing one or more state blocks and/or transitions to one or more state blocks may be referred to as a graphical hierarchy. Each of the chart elements may correspond to a status of a physical device, a subsystem, a model, etc. of a system being modeled (e.g., chart elements may behavioral so that a state may correspond to a status of a device, a subsystem, etc.).

In some implementations, the chart may include graphical symbols, transitions, and/or state transitions associated with the state blocks of the chart. The graphical symbols may include, for example, textual information that provides event-based conditions, time-based conditions, invariants, etc. to the state blocks, transitions, junctions, etc. In some implementations, one or more of the state blocks, transitions, and/or state transitions, may include textual code that may be understood and processed by textual engine 228 of TCE 220. The textual code may include, for example, one or more functions, matrices, data, etc. that may be understood and processed by textual engine 228.

In some implementations, TCE 220 may cause client device 210 to display a user interface so that the user may create and/or view the model and the chart. For example, the user may utilize the user interface to create the state blocks for the chart, and to connect the state blocks together. The user may associate the graphical symbols with the state blocks and/or other elements of the chart (e.g., transitions, state transitions, junctions, etc.), and may add the textual code in the one or more state blocks. The user may utilize the user interface to provide the chart within the model.

As further shown in FIG. 4, process 400 may include parsing the chart into a textual portion and a graphical portion (block 420). For example, parser 222 of TCE 220 may receive information associated with the chart, and may identify, based on the information, a portion of the chart that may be understood and processed by textual engine 228 (e.g., a textual portion) and a portion of the chart that may be understood and processed by graphical engine 226 (e.g., a graphical portion). In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as the textual portion. For example, parser 222 may designate functions, arrays, matrices, algorithms, etc. in the chart as the textual portion.

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as the graphical portion. For example, parser 222 may designate time-based conditions, event-based conditions, other conditions, hierarchy information, etc. as the graphical portion.

As further shown in FIG. 4, for the textual portion (block 420—TEXTUAL PORTION), process 400 may include processing the textual portion with the textual engine to generate textual results (block 430). For example, parser 222 may provide the textual portion of the chart to textual engine 228, and textual engine 228 may process the textual portion of the chart to generate textual results. In some implementations, textual engine 228 may execute the textual portion of the chart to generate the textual results. For example, assume that the textual portion of the chart includes a function for performing matrix calculations on data. In such an example, textual engine 228 may execute the function so that the matrix calculations are performed on the data. The matrix resulting from the calculations may be referred to as textual results. In another example, assume that the textual portion of the chart includes an algorithm for performing data analysis. In this example, textual engine 228 may execute the algorithm so that the data analysis is performed. The results of the data analysis may be referred to as textual results.

As further shown in FIG. 4, for the graphical portion (block 420—GRAPHICAL PORTION), process 400 may include transforming, if necessary, the graphical portion into a form understood by the graphical engine (block 440). For example, parser 222 may determine whether any of the graphical portion of the chart will not be understood by graphical engine 226. In some implementations, parser 222 may identify text in the graphical portion that may not be understood by graphical engine 226. For example, assume that the graphical portion includes the text before(abs(a*eig (b(1:10, 1:10))), sec), and that graphical engine 226 does not understand the text since graphical engine 226 needs to calculate a time to execute the text. In this example, parser 222 may provide the text to transformer 224, and transformer 224 may transform the text into a form understood by graphical engine 226. For example, transformer 224 may transform the text to utilize counters maintained by the graphical environment (e.g., Simulink) so that a time (e.g., one second, two seconds, etc.) may be calculated by graphical engine 226. In some implementations, transformer 224 may provide the transformed text to graphical engine 226 for processing. In some implementations, the text provided in the graphical portion may include textual operations (e.g., after(abs(a*eig(b(1:10, 1:10))), sec)) that are understood by the textual environment, such as, for example, TCE operations.

In some implementations, parser 222 may provide the remaining graphical portion (e.g., which may be understood by graphical engine 226) directly to graphical engine 226. In some implementations, parser 222 may determine that all of the graphical portion may be understood by graphical engine 226. In such a situation, parser 222 may provide the entire graphical portion to graphical engine 226 and transformer 224 may not be utilized.

As further shown in FIG. 4, for the graphical portion (block 420—GRAPHICAL PORTION), process 400 may include processing the graphical portion with the graphical engine to generate graphical results (block 450). For example, parser 222 may provide, to graphical engine 226, the graphical portion of the chart that is understood by graphical engine 226. Transformer 224 may provide, to graphical engine 226, any of the graphical portion that has been transformed into a form that is understood by graphical engine 226. Graphical engine 226 may process the graphical portion of the chart to generate graphical results. In some implementations, graphical engine 226 may execute the graphical portion of the chart to generate the graphical results. For example, assume that the graphical portion of the chart includes instructions to combine graphical and tabular representations. In such an example, graphical engine 226 may execute the instructions so that the graphical and tabular representations are combined. The resulting combination may be referred to as graphical results. In another example, assume that the graphical portion of the chart includes an event-based condition (e.g., transition to state block A when a function is calculated). In this example, graphical engine 226 may execute the event-based condition so that state block A is transitioned to. The results of the execution of the event-based condition may be referred to as graphical results. In some implementations, graphical engine 226 may execute textual information.

As further shown in FIG. 4, process 400 may include combining the textual results with the graphical results to generate chart results (block 460). For example, TCE 220 may combine the textual results, generated by textual engine 228, with the graphical results generated by graphical engine 226 to generate chart results. In some implementations, the chart results may include results associated with execution of the chart. For example, assume that the textual results include a calculation of a function bar and that the graphical results include utilizing the calculation when a state block B is transitioned to. In such an example, the chart results may include transitioning to state block B and utilizing the calculation of the function bar. In another example, assume that the textual results include performing a matrix calculation and that the graphical results include computing the time period based on the array-based computations. In such an example, the chart results may include determining when the time period has expired and utilizing the matrix calculation after the time period has expired and/or utilizing the matrix calculation to determine the time period. In some implementations, the chart may model reactive systems via state machines and flow charts within a model. In some implementations, the chart may use a variant of a finite-state machine notation, which may enable representation of hierarchy, parallelism, event broadcast, and/or history within the chart. In some implementations, the chart may provide state transition tables and/or truth tables. In some implementations, the chart may represent discrete modes of a system by a state, may control how a system responds to faults and failures within the system, and may schedule when specific tasks occur (e.g., either within the chart or within an overall model).

As further shown in FIG. 4, process 400 may include utilizing the chart results to execute the model and generate model results (block 470). For example, TCE 220 may utilize the chart results in the model (e.g., during execution of the model) to generate model results. In some implementations, the model results may include results associated with execution of the model based on the chart results. For example, assume that the chart results include transitioning to state block B and utilizing a calculation of a function bar. After state block B is transitioned to and the function bar is calculated, TCE 220 may utilize the function calculation in the model to generate the model results. In another example, assume that the chart results include determining when a time period has expired and utilizing the computations to determine the time period. After the matrix calculation is performed, TCE 220 may utilize the matrix calculation in the model to generate the model results and/or to determine the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
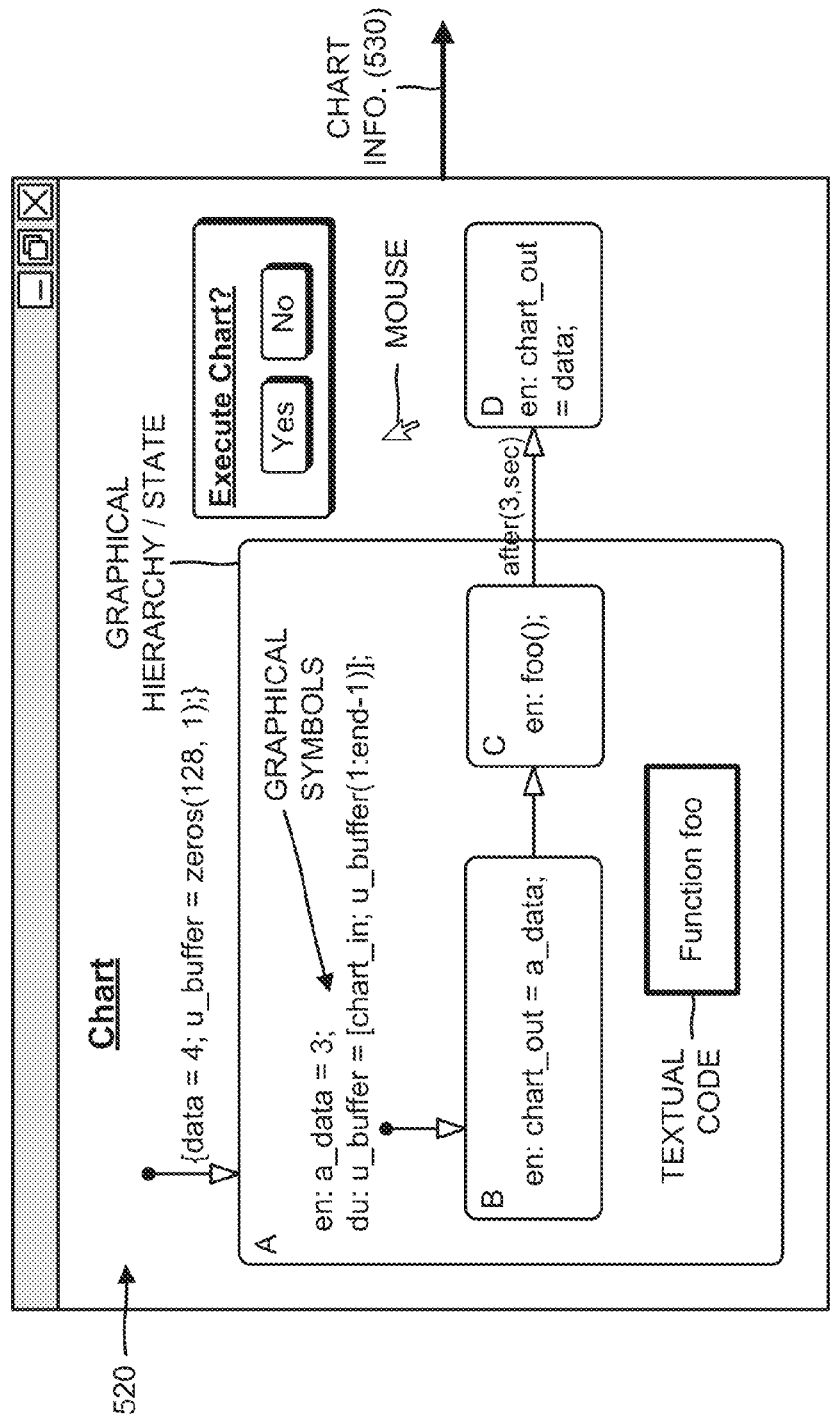

FIGS. 5A-5E are diagrams of an example 500 relating to example process 400 shown in FIG. 4. In example 500, assume that a user of client device 210 utilizes TCE 220 to create a model or to import the model into TCE 220. As shown in FIG. 5A, TCE 220 may cause client device 210 to display the model in a user interface 510. The model may include a sine wave block, a chart block, and a scope block.

The sine wave block may include a representation of a sine wave that is to be displayed by the scope block. In example 500, assume that the sine wave block provides a chart_in signal (e.g., a sine wave signal) to the chart block. The chart block may include a representation of a chart that processes the sine wave signal so that it may be understood by the scope block. The chart block may include a graphical portion and a textual portion. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal). In some implementations, the chart block may include a chart (FIG. 5B) that may be executed based on different execution semantics provided by a user and/or inferred from the model. The execution semantics may include dynamic notions associated with continuous time for example, computing the time derivatives of a dynamic system based on matrix calculations, etc. In some implementations, the chart may be provided in an environment that includes multiple domains.

As further shown in FIG. 5A, TCE 220 may instruct client device 210 to display an option to execute the model. For example, user interface 510 may display a window or some other display mechanism that requests whether the user wants to execute the model. If the user elects to execute the model (e.g., via selection of a "Yes" button with a mouse or other selection mechanism), TCE 220 may execute the model. In some implementations, the user may select a "Play" button with the mouse, and TCE 220 may execute the model. In order to execute the model, assume that TCE 220 needs to execute the chart block, as shown in a user interface 520 of FIG. 5B. In some implementations, the model may include computational semantics associated with graphical and textual elements, and may include computational semantics associated with various blocks in the model. In some implementations, TCE 220 may debug the model before or during execution of the model or generation of code.

As shown in user interface 520, the chart may include a graphical hierarchy of state blocks A, B, C, and D. The graphical hierarchy may include the arrangement of the state blocks in the chart. For example, state block A may be transitioned to first, state block B may be transitioned to second, state block C may be transitioned to third, and state block D may be transitioned to last. The state blocks may include state information provided by graphical symbols. For example, state block A may include the graphical symbols en: a_data=3 and du: u_buffer=[chart_in; u_buffer (1:end-1)] (e.g., which may be parsed by graphical engine 226 into a portion "du" that may be understood by graphical engine 226 and another portion "u_buffer=[chart_in; u_buffer(1:end-1)]" that may be understood by textual engine 228); state block B may include the graphical symbols en: chart_out=a_data; state block C may include the graphical symbols en:foo( ); and state block D may include the graphical symbols en: chart_out=data. Some or all of the graphical hierarchy, state blocks A, B, C, and D, and the graphical symbols may be understood by graphical engine 226. State block A may also include textual code (e.g., a function foo) that may be understood by textual engine 228. In some implementations, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values). In some implementations, graphical engine 226 may execute graphical code and textual code (e.g., C code), but may not execute dynamically-typed and/or array-based code. In some implementations, textual engine 228 may execute the dynamically-typed, array-based code.

As further shown in FIG. 5B, when the chart wakes up, the default transitions of the chart may be executed. For example, an action in a default transition (e.g., {data=4; u_buffer=zeros(128, 1);}) may be executed, and state block A may be marked as active. Graphical symbols of state block A (e.g., an entry action en: a_data=3) may be executed, and default transitions inside state block A may be executed to establish an active child of state block A (e.g., mark state block B as active). Graphical symbols of state block B (e.g., an entry action en: chart_out=a_data) may be executed, and the chart execution may be complete (e.g., the chart may go to sleep) since no child states remain. When the chart sleeps, state blocks A and B may be active. A next time the chart wakes up, graphical symbols of state block A (e.g., the during action du: u_buffer=[chart_in; u_buffer(1:end-1)]) may be executed since there are no direct outer transitions of state block A. Outer transitions of state block B may be checked, and, since there is no condition, the transition to state block C may be assumed to be true. Therefore, the chart may transition from state block B to state block C. State block C may become active and state block A may remain active. The chart may keep waking up according to solver settings and/or system dynamics, and may wake up many times or a few times. Every time the chart wakes up, the outer transitions of all active state blocks may be checked, for example, in a top-down manner. If an outer transition of a particular state block is not true, a during action of the particular state block may be executed. Otherwise, a transition may occur to a next state block. This may result in one or more executions of the during action of state block A (e.g., du: u_buffer=[chart_in; u_buffer(1:end-1)]).

At some point, the chart may wake up, with a condition specified in an outer transition of state block C (e.g., after(3, sec)) being true, after state block C is first entered. When this condition is true, a transition from state block C may occur. State block C may be marked as inactive when state block C is exited. State block A may be marked as inactive since the outer transition of state block C (e.g., after(3, sec)) leaves a graphical boundary of state block A. State block C may transition to state block D, and state block D may be marked as active. At this time, only state block D may be active in the chart. Graphical symbols of state block D (e.g., an entry action en: chart_out=data) may be executed at this time.

As further shown in FIG. 5B, TCE 220 may instruct client device 210 to display an option to execute the chart or may automatically execute the chart when the model is executed. For example, user interface 520 may display a window or some other display mechanism that requests whether the user wants to execute the chart. If the user elects to execute the chart (e.g., via selection of a "Yes" button with a mouse or other selection mechanism), TCE 220 may execute the chart to generate chart information 530, as further shown in FIG. 5B. Chart information 530 may include information associated with the graphical hierarchy, state blocks A, B, C, and D, the graphical symbols, the textual code, and/or execution of the graphical hierarchy, state blocks A, B, C, and D, the graphical symbols, and/or the textual code. In some implementations, the chart may be executed based on conditions in a model (e.g., a time-based block diagram model). For example, if a temperature in a model of an HVAC system exceeds a certain value (e.g., at a particular time), a status of a heater device may change from on to off.

In some implementations, TCE 220 may begin searching at a lowest level of the graphical hierarchy for data and/or a function and move up the graphical hierarchy level by level until the data/function is found. In some implementations, TCE 220 may include a global or logical workspace that may be searched first or last, for example, for data and/or a function. In some implementations, TCE 220 may execute the chart by executing one or more transitions, by executing in microsteps, by executing all events and actions at a hierarchical level, etc. Each microstep may result in a set of transitions that result in a stable state configuration (e.g., the result of one state chart execution). A state machine may continue to execute microsteps until no state transitions are possible from a current state configuration.

Figure 5C:
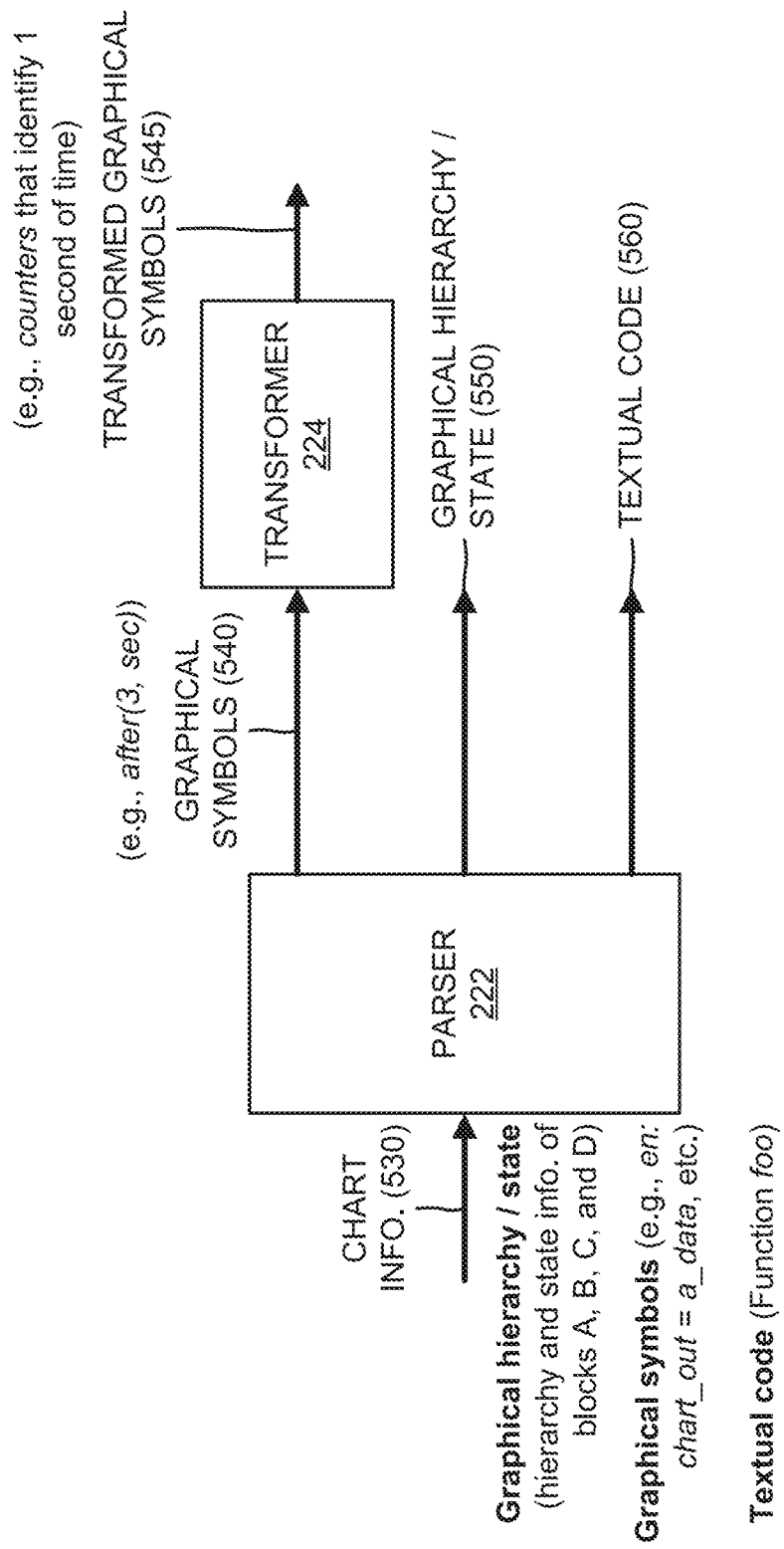

As shown in FIG. 5C, assume that TCE 220 provides chart information 530 to parser 222. For example, TCE 220 may provide, to parser 222, the information associated with the graphical hierarchy and the state of the chart (e.g., the hierarchy and active state information of state blocks A, B, C, and D); the information associated with the graphical symbols (e.g., chart_out=data, after(3, sec), etc.); the information associated with the textual code (e.g., the function foo); and/or the execution of the graphical hierarchy, state blocks A, B, C, and D, the graphical symbols, and/or the textual code. Parser 222 may parse chart information 530 into information 540 associated with graphical symbols that are not understood by graphical engine 226; information 550 associated with the graphical hierarchy and state blocks A, B, C, and D; and information 560 associated with the textual code.

Information 540 may not be generated if all of the graphical symbols, in chart information 530, are understood by graphical engine 226. In such a situation, parser 222 may provide information 540 associated with the graphical symbols directly to graphical engine 226. In one example, information 540 may include the text after(3, sec) or after (abs(a*eig(b(1:10, 1:10))), sec), which may not be understood by graphical engine 226 since graphical engine 226 does not understand TCE language syntax (e.g., abs(a*eig (b))). In this example, parser 222 may provide the text to transformer 224, and transformer 224 may transform the text into a form understood by graphical engine 226 (e.g., transformed graphical symbols 545, as shown in FIG. 5C). For example, transformer 224 may transform the text to utilize counters maintained by the graphical environment (e.g., Simulink) so that a time (e.g., one second, two seconds, etc.) may be calculated by graphical engine 226. Information 550 associated with the graphical hierarchy and state blocks A, B, C, and D may include, for example, the hierarchy and state information of state blocks A, B, C, and D, information identifying that state A is a parent state for state B, etc. Information 560 associated with the textual code may include, for example, information associated with the function foo.

Figure 5D:
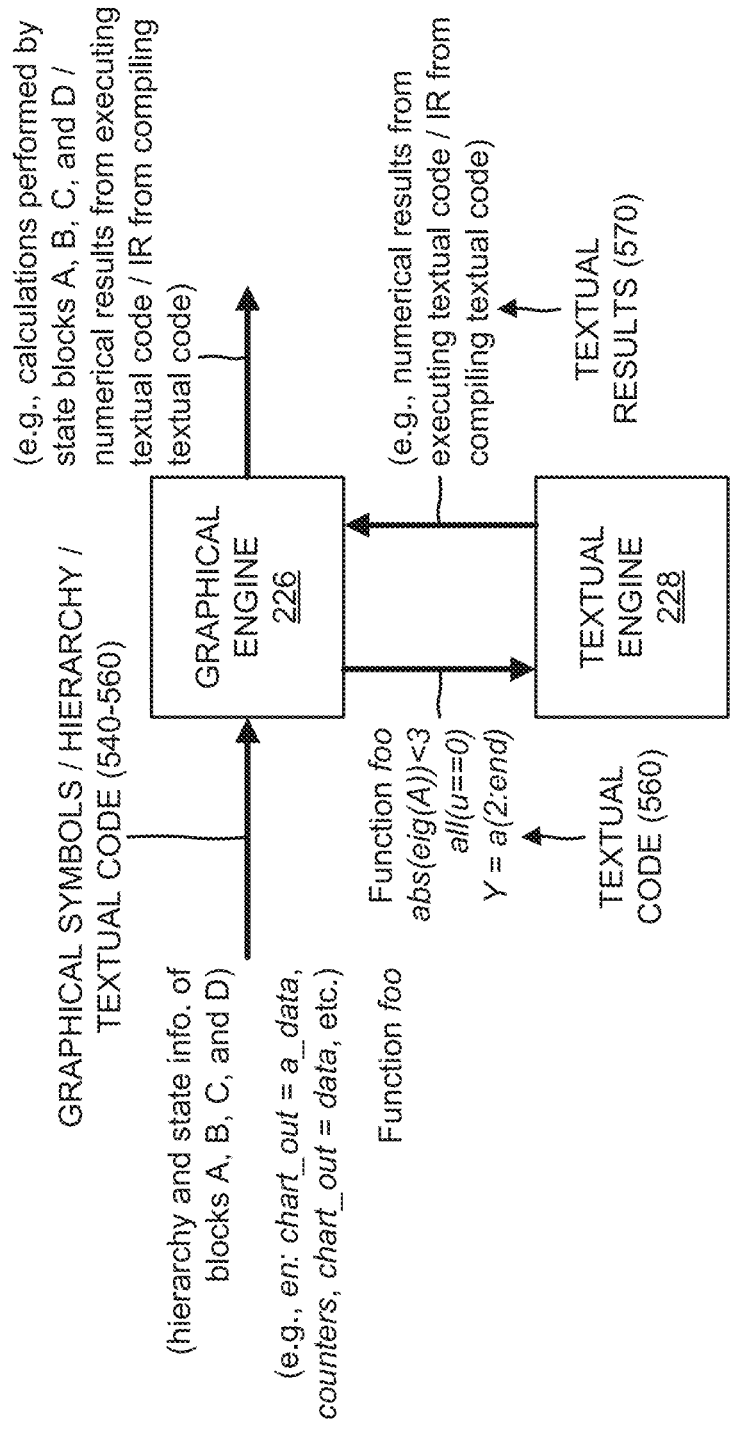

As shown in FIG. 5D, graphical engine 226 may receive information 540 associated with graphical symbols (e.g., chart_out=a_data), transformed graphical symbols 545 (e.g., counters), information 550 associated with the graphical hierarchy and state (e.g., the hierarchy and state information of state blocks A, B, C, and D), and information 560 associated with the textual code (e.g., the functions foo, abs(eig(A))<3, all(u==0), and Y=a(2:end)). In some implementations, information 560 associated with the textual code may include zero crossing detection and location information, for example, to determine when discrete events occur.

Graphical engine 226 may provide information 560 associated with textual code to textual engine 228. Textual engine 228 may process information 560 to generate textual results 570. In example 500, assume that textual results 570 include numerical results from executing the textual code (e.g., the function foo) and/or an intermediate representation (IR) from compiling the textual code. Textual engine 228 may provide textual results 570 to graphical engine 226. Graphical engine 226 may process information 540, transformed graphical symbols 545, information 550, and textual results 570 to generate chart results 580. In example 500, assume that chart results 580 include the calculations performed by one or more of state blocks A, B, C, and/or D, numerical results from executing the textual code (e.g., the function foo), and/or an intermediate representation (IR) from compiling the textual code.

After one or more portions of the chart are executed and chart results 580 are generated, TCE 220 may utilize chart results 580 to execute the model. For example, as described above in connection with FIG. 5B, the chart may wake up and execute one or more of state blocks A, B, C, and D. In some implementations, the chart may execute one or more portions of a model and/or the model may execute one or more portions of the chart. As shown in FIG. 5E, TCE 220 may cause client device 210 to display a user interface 590 that includes the executed model. As shown in user interface 590, the chart block may receive an input signal (e.g., a sine wave) from the sine wave block, and may output a voltage/time signal, based on the input signal, to the scope block. As further shown, the voltage/time signal may correspond to the calculations performed by state blocks A, B, C, and/or D and/or the calculation of the function foo.

As indicated above, FIGS. 5A-5E are provided merely as an example. Other examples are possible and may differ from what was described with regard to FIGS. 5A-5E.

FIG. 6 is a flow chart of an example process 600 for performing graphical function specialization in a technical computing environment. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a TCE state chart with a function and function call to the function (block 610). For example, TCE 220 may cause client device 210 to display a user interface to a user of client device 210. The user interface may include mechanisms (e.g., menus, buttons, icons, libraries, etc.) that enable the user to create a state chart for TCE 220. In some implementations, the user may wish to create a state chart with one or more chart elements (e.g., state blocks), one or more input signals, and one or more output signals. Each of the state chart elements may be associated with a state of a physical device, a subsystem, another model, etc. of a system being modeled.

In some implementations, the user of client device 210 may utilize TCE 220 to import the state chart into TCE 220 from memory (e.g., memory 330 or storage component 340) of client device 210. In some implementations, the user of client device 210 may utilize TCE 220 to import the state chart into TCE 220 from another source, such as, for example, server device 230 or an external memory device (e.g., a CD-ROM, a flash memory, etc.).

In some implementations, the state chart may include at least one state block and at least one function block. The state block may include textual code (e.g., a function call) that is understood by graphical engine 226 and/or textual engine 228 of TCE 220. The function call may call a function provided in the function block of the state chart. The function call may include one or more call input variables and one or more call output variables. The function block may include textual code (e.g., the function) that is understood by graphical engine 226 and/or textual engine 228 of TCE 220. The function may include one or more function input variables and one or more function output variables.

As further shown in FIG. 6, process 600 may include initiating execution of the TCE state chart (block 620). For example, the user may instruct TCE 220 to execute the state chart, and TCE 220 may initiate execution of the state chart based on the user's instruction. In some implementations, TCE 220 may initiate execution of the state chart when the user inputs a command or selects a display mechanism (e.g., a button, a menu item, etc.) that instructs TCE 220 to execute the state chart. For example, TCE 220 may cause client device 210 to display an Execution button in the user interface. When the user selects the Execution button, the selection may cause TCE 220 to initiate execution of the state chart. In another example, TCE 220 may cause client device 210 to display a command window in the user interface. The user may enter a command (e.g., "execute state chart") in the command window, and TCE 220 may initiate execution of the state chart based on the entered command. In some implementations, the state chart may be an element in a larger model (or another state chart), and execution of the model may initiate execution of the state chart. In some implementations, the state chart may be executed based on, for example, an asynchronous call, a sample time hit, a zero crossing, etc.

As further shown in FIG. 6, process 600 may include parsing the function into function input(s) and/or function output(s) (block 630). For example, parser 222 or graphical engine 226 of TCE 220 may receive chart information associated with the state chart. In some implementations, the chart information may include information associated with state blocks, sections of the state blocks, textual code of the state blocks, etc. provided in the state chart. TCE 220 may identify, based on the chart information, a portion of the state chart that may be understood and processed by graphical engine 226 (e.g., the function input variable(s) and/or output variable(s)), and a portion of the state chart that may be understood and processed by textual engine 228 (e.g., the call input variable(s) and/or output variable(s)).

In some implementations, parser 222 or graphical engine 226 may have access to a data structure (e.g., a database) that stores information associated with the graphical environment of TCE 220 (e.g., and understood by graphical engine 226). Parser 222 or graphical engine 226 may compare the chart information with information stored in the data structure, and may determine that particular portions of the chart information match the information in the data structure. Parser 222 or graphical engine 226 may designate the matching portions of the chart information as a graphical portion. For example, parser 222 or graphical engine 226 may designate the function input variable(s) and/or the function output variable(s) as the graphical portion. Parser 222 may provide the function input variable(s) and/or the function output variable(s) to graphical engine 226.

As further shown in FIG. 6, process 600 may include parsing the function call into call input(s) and/or call output(s) (block 640). For example, parser 222 or graphical engine 226 may have access to a data structure (e.g., a database) that stores syntax associated with the language of the textual environment of TCE 220 (e.g., and understood by textual engine 228). Parser 222 or graphical engine 226 may compare the chart information with the syntax stored in the data structure, and may determine that particular portions of the chart information match the syntax. Parser 222 or graphical engine 226 may designate the matching portions of the chart information as a textual portion. For example, parser 222 or graphical engine 226 may designate the call input variable(s) and/or the call output variable(s) as the textual portion. Parser 222 or graphical engine 226 may provide the call input variable(s) and/or the call output variable(s) to textual engine 228.

As further shown in FIG. 6, process 600 may include processing the function input(s)/output(s) and the call input(s)/output(s) (block 650). For example, graphical engine 226 may process the function input variable(s) and/or the function output variable(s). In some implementations, textual engine 228 may process the call input variable(s) and/or the call output variable(s). In some implementations, based on the processing by graphical engine 226 and textual engine 228, TCE 220 may determine that the function is called two or more times (e.g., by the function call) with different data types for the call input variable(s) and/or the call output variable(s). For example, assume that a function fun is called three times by a function call with three call input variables. A first call input variable x_x8 may include an unsigned integer data type, a second call input variable x_double may include a double precision data type, and a third call input variable x_single may include a single precision data type. In this example, TCE 220 may determine that function fun is called three times with three different data types (e.g., an unsigned integer data type, a double precision data type, and a single precision data type) for the call input variables.

In some implementations, based on the processing by graphical engine 226 and textual engine 228, TCE 220 may determine that at least one call output variable of the function call includes a call output wildcard. For example, assume that a function fun includes two function output variables xx1 and xx2, and that a function call includes a call output wildcard (e.g., ~, +, #, @, $, or some other alphabetical, numeric, or alphanumeric character or characters) and a call output variable x2. In this example, TCE 220 may determine that at least one call output variable, of the function call to function fun, includes the call output wildcard.

In some implementations, based on the processing by graphical engine 226 and textual engine 228, TCE 220 may determine that a number of function input variables is greater than a number of call input variables, and/or may determine that a number of function output variables is greater than a number of call output variables. For example, assume that a function fun includes two function input variables xx1 and xx2 and one function output variable yy1. Further, assume that a function call to function fun includes one call input variable x1 and one call output variable y1. In this example, TCE 220 may determine that the number (e.g., two) of function input variables is greater than the number (e.g., one) of call input variables, and that the number (e.g., one) of function output variables is equal to the number (e.g., one) of call output variables.

As further shown in FIG. 6, if the function is called two or more times with different data types for the call input(s) and/or the call output(s) (block 650—DIFFERENT DATA TYPES), process 600 may include generating code, for the state chart, that includes a method for each different data type (block 660). For example, if TCE 220 determines that the function is called two or more times (e.g., by the function call) with different data types for the call input variable(s) and/or the call output variable(s), TCE 220 may generate code, for the state chart, that includes a call (e.g., a procedure, a method, a function, etc. in different programming paradigms) for each of the different data types.

In some implementations, assume that a function fun is called three times by a function call with three call input variables. A first call input variable x_x8 may include an unsigned integer data type, a second call input variable x_double may include a double precision data type, and a third call input variable x_single may include a single precision data type. In this example, TCE 220 may generate code that includes a first function, a second function, and a third function. The first function may include function fun implemented with first call input variable x_x8. The second function may include function fun implemented with second call input variable x_double. The third function may include function fun implemented with third call input variable x_single. In some implementations, the generated code may include code (e.g., C code, C++ code, HDL code, Java™ Javascript, Python, an intermediate representation for another compile, such as LLVM, machine code, assemble, etc.) that may be utilized by a physical device (e.g., a robot, manufacturing equipment, etc.).

As further shown in FIG. 6, if at least one call output of the function call includes a call output wildcard (block 650—CALL OUTPUT WILDCARD), process 600 may include generating code, for the state chart, that includes a function with particular function output(s) based on the call output wildcard (block 670). For example, if TCE 220 determines that at least one call output variable of the function call includes a call output wildcard, TCE 220 may generate code, for the state chart and based on the call output wildcard, that includes a function with particular function output variable(s).

In some implementations, assume that a function fun includes two function output variables xx1 and xx2 (e.g., fun[xx1, xx2]=fun( )), and that a function call (callbar) includes a call output wildcard (~) and a call output variable x2 (e.g., [~, x2]=fun( )). In this example, TCE 220 may generate code that includes a function. The function may include function fun implemented with only function output variable xx2. TCE 220 may ignore function output variable xx1, since the call output wildcard corresponds with function output variable xx1, and may not implement function output variable xx1 in the function. In some implementations, the function call may include two or more output wildcards, and TCE 220 may ignore function output variables that correspond to the two or more output wildcards. In some implementations, the function call may include one or more input wildcards, and TCE 220 may ignore function input variables that correspond to the one or more input wildcards.

As further shown in FIG. 6, if a number of function input(s) is greater than a number of call input(s) (block 650—FUNCTION INPUT(S)>CALL INPUT(S)), process 600 may include generating code, for the state chart, that includes a method with the number of function input(s) being equal to the number of call inputs (block 680). For example, if TCE 220 determines that a number of function input variables is greater than a number of call input variables, TCE 220 may generate code, for the state chart, that includes a function with the number of function input variables being equal to the number of call input variables.

In some implementations, assume that a function fun includes two function input variables xx1 and xx2 and one function output variable yy1 (e.g., yy1=fun(xx1, xx2)). Further, assume that a function call to function fun includes one call input variable x1 and one call output variable y1 (e.g., y1=fun(x1)). In this example, TCE 220 may generate code that includes a function. The function may include function fun implemented with only function input variable xx1. TCE 220 may ignore function input variable xx2, since the function call only includes call input variable x1 that corresponds with function input variable xx1, and may not implement function input variable xx2 in the function. In some implementations, a number of call input variables may be greater than a number of function input variables, and TCE 220 may match call input/output variables and function input/output variables based on a predetermined parameter (e.g., by name). In such implementations, textual engine 228 may utilize default values (e.g., provided by the user or automatically generated) for inputs that are not provided; may analyze the function to determine whether there is a well-defined behavior with a single input; may generate an error message based on lazy evaluation; may request user input dynamically at execution time; etc.

In some implementations, if TCE 220 determines that a number of function output variables is greater than a number of call output variables, TCE 220 may generate code, for the state chart, that includes a function with the number of function output variables being equal to the number of call output variables. For example, assume that a function fun includes one function input variable xx1 and two function output variables yy1 and yy2 (e.g., yy1=fun(xx1) and yy2=fun(xx1)). Further, assume that a function call to function fun includes one call input variable x1 and one call output variable y1 (e.g., y1=fun(x1)). In this example, TCE 220 may generate code that includes a function. The function may include function fun implemented with only function output variable yy1. TCE 220 may ignore function output variable yy2, since the function call includes only call output variable y1 that corresponds with function output variable yy1, and may not implement function output variable yy2 in the function.

In some implementations, a user may specify additional function input variables in a function. For example, the user may create a function fun with the syntax yy1=fun(uu1, uu2, additional), where additional may correspond to additional function input variables. This may enable the user to specify an arbitrary number of call input variables in a function call. For example, the user may create a function call with the syntax y1=fun(u1, u2, u3, u4, u5), where u1 through u5 may correspond to call input variables. In this example, TCE 220 may correlate call input variable u3 with function input variable additional1, may correlate call input variable u4 with function input variable additional2, and may correlate call input variable u5 with function input variable additional3. Such an arrangement may provide flexibility into how many call input variables are included in the function call.

As further shown in FIG. 6, if the function is called with the same data types for the call input(s) and/or the call output(s), if the call output(s) do not include a call output wildcard, and if a number of function input(s) equals a number of call input(s) (block 650—SAME DATA TYPES/ NO CALL OUTPUT WILDCARD/FUNCTION INPUT(S)=CALL INPUT(S)), process 600 may include generating code, for the state chart, that includes a function that correlates the function with the function call (block 690). For example, if TCE 220 determines that the function is called (e.g., by the function call) with the same data types for the call input variable(s) and/or the call output variable(s), determines that no call output variables of the function call include a call output wildcard, and determines that a number of function input variables is equal to a number of call input variables, TCE 220 may generate code, for the state chart, that includes a function correlating the function with the function call.

In some implementations, TCE 220 may cause client device 210 to provide the generated code for display to the user. In some implementations, TCE 220 may cause client device 210 to store the generated code in memory (e.g., memory 330, storage component 340, etc.) associated with client device 210 and/or server device 230. In some implementations, TCE 220 may cause client device 210 to embed the generated code in a physical device (e.g., a robot, manufacturing equipment, etc.) so that the physical device may operate based on the generated code.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
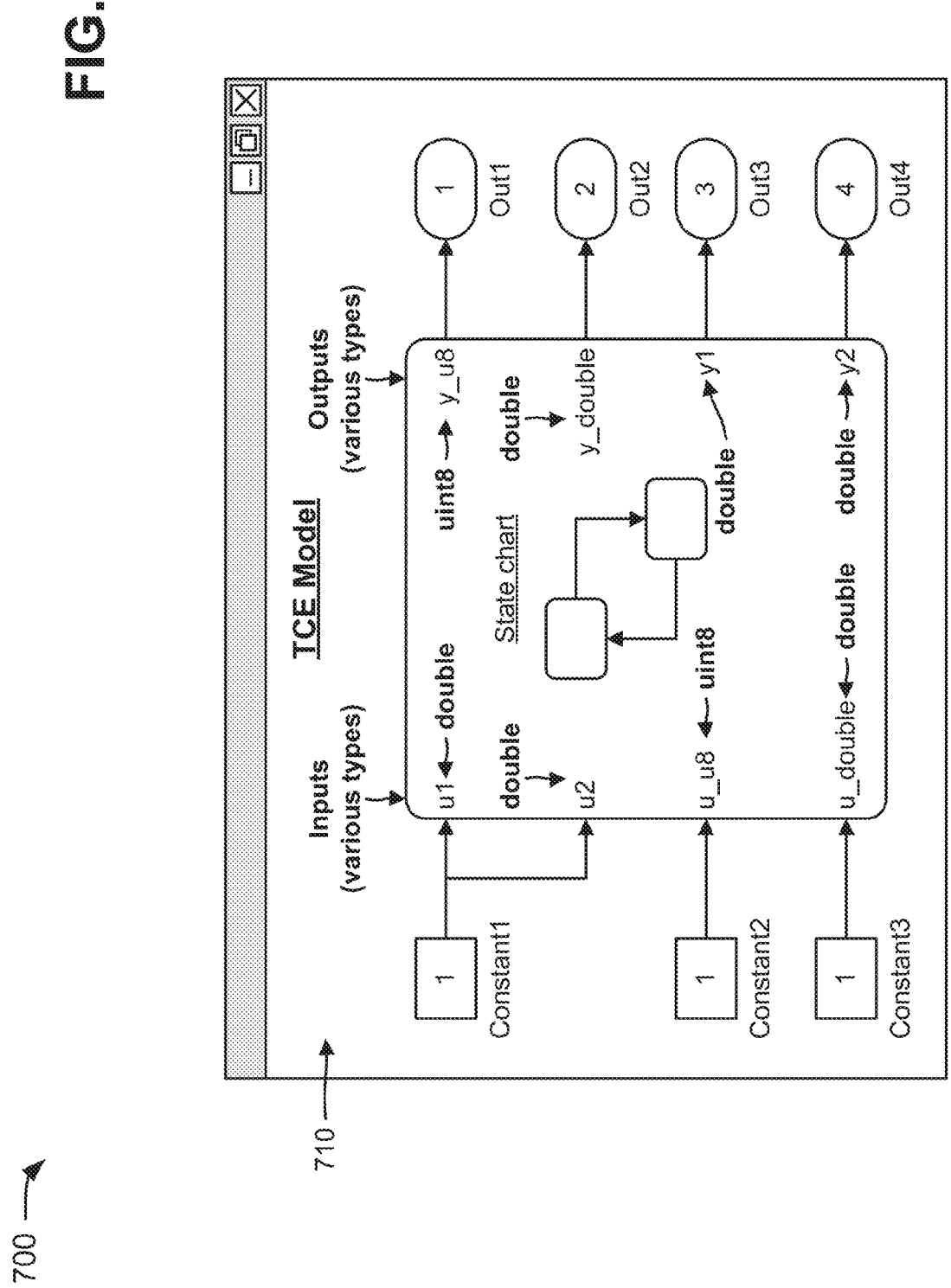

FIGS. 7A-7G are diagrams of an example 700 relating to example process 600 shown in FIG. 6. In example 700, assume that a user of client device 210 utilizes TCE 220 to create a model or to import the model into TCE 220. As shown in FIG. 7A, TCE 220 may cause client device 210 to display the model in a user interface 710 as the user creates the model or after the user imports the model. Assume that the model includes a state chart that receives two inputs (u1 and u2) from a first constant (Constant1), receives an input (u_u8) from a second constant (Constant2), and receives an input (u_double) from a third constant (Constant3). The inputs may include various data types. For example, inputs u1, u2, and u_double may include a double precision data type, and input u_u8 may include an unsigned integer (uint8) data type. Further, assume that the state chart provides a first output (y_u8 or Out1), a second output (y_double or Out2), a third output (y1 or Out3), and a fourth output (y2 or Out4). The outputs may include various data types. For example, outputs y1, y2, and y_double may include a double precision data type, and output y_u8 may include an unsigned integer (uint8) data type. The state chart may include variable attributes, such as, for example, a representation of calculations to be performed, dimensions, complexity, etc.

Figure 7B:
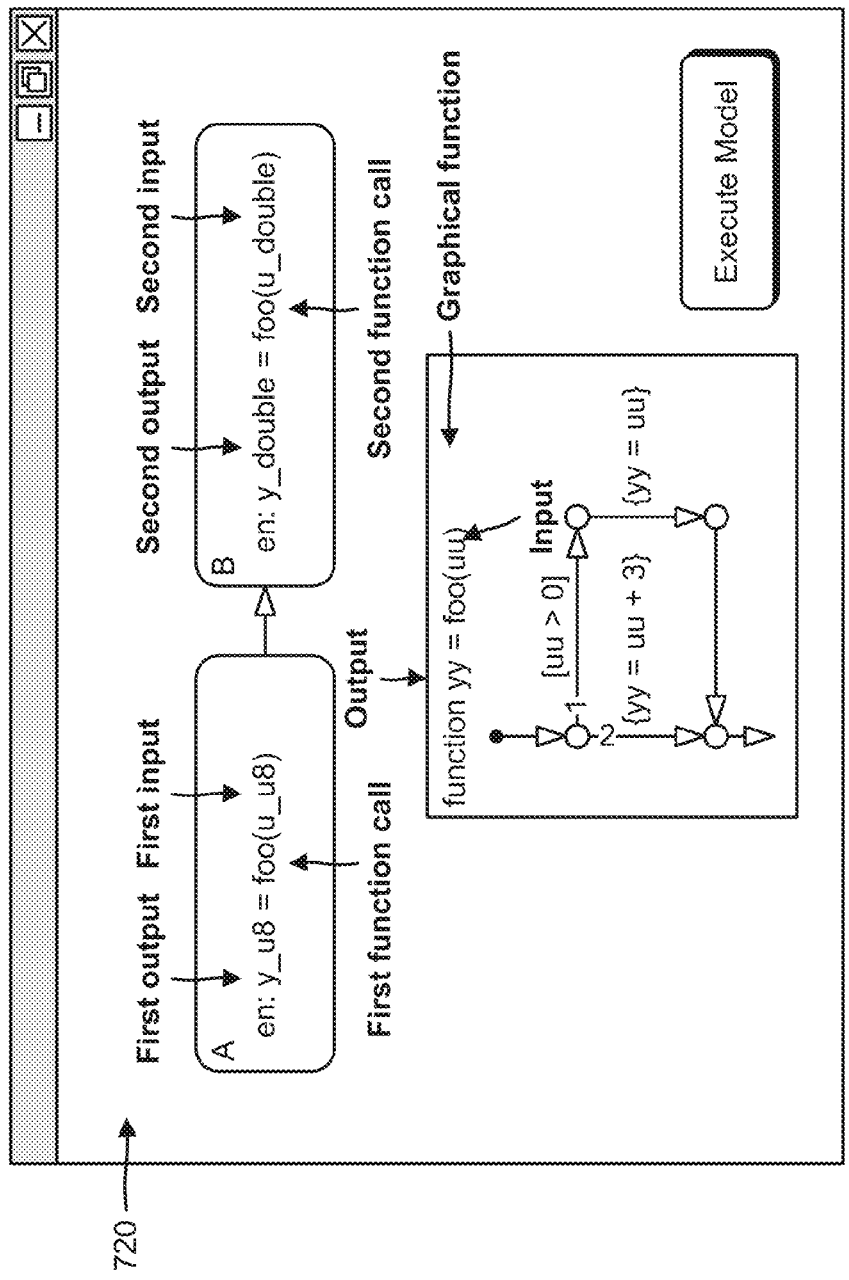

In example 700, assume that the user utilizes TCE 220 to create the state chart or to import the state chart into TCE 220 and the model. For example, the user may select the state chart block of the model in user interface 710, and TCE 220 may display a user interface 720 that enables the user to create the elements of the state chart, as shown in FIG. 7B. As shown, TCE 220 may cause client device 210 to display the state chart as the user creates the state chart or after the user imports the state chart. In example 700, assume that the state chart includes a first state block (e.g., state block A), a second state block (e.g., state block B), and a function block. State block A may include a representation of calculations to be performed. As further shown in FIG. 7B, state block A may include a first function call to a function foo (e.g., y_u8=foo(u_u8)) with a first call input (u_u8) and a first call output (y_u8). The first function call, the first call input, and the first call output may be understood by textual engine 228 of TCE 220. State block B may include a second function call to function foo (e.g., y_u8=foo(u_u8)) with a second call input (u_double) and a second call output (y_double). The second function call, the second call input, and the second call output may be understood by textual engine 228 of TCE 220. In example 700, assume that first call input u_u8 includes an unsigned integer data type and that second call input u_double includes a double precision data type.

The function block may include a graphical function (e.g., yy=foo(uu)) with a function input (uu) and a function output (yy). The graphical function may include paths for calculating yy, such as, for example, a first path (e.g., yy=uu) when uu is greater than zero, and a second path (e.g., yy=uu+3) when uu is less than or equal to zero. The graphical function, the function input, and the function output may be understood by graphical engine 226 of TCE 220.

After creating or importing the state chart, assume that the user instructs TCE 220 to execute the model by entering an "execute model" command or by selecting an "execute model" button, as shown in FIG. 7B. TCE 220 may execute the model and the state chart based on the user's instruction. When the state chart is executed by TCE 220, state block A may execute first function call y_u8=foo(u_u8), which may cause the graphical function block to execute with first function input u_u8 and first function output y_u8. State block B may execute second function call y_double=foo(u_double), which may cause the graphical function block to execute with second function input u_double and second function output y_double.

As shown in FIG. 7C, when executing the state chart, TCE 220 may provide chart information to parser 222 of TCE 220. The chart information may include, for example, information associated with the arrangement of state blocks A and B, information associated with the first function call (e.g., y_u8=foo(u_u8)), information associated with the second function call (e.g., y_double=foo(u_double)), information associated with the graphical function (e.g., yy=foo(uu)), etc. Parser 222 may divide the chart information into a function portion and a function call portion. In example 700, assume that the function portion includes the syntax foo, yy, and uu, and that the function call portion includes the syntax foo, y_u8, u_u8, y_double, and u_double.

As further shown in FIG. 7C, parser 222 may provide the function portion to graphical engine 226, and graphical engine 226 may process the function portion to generate function-based code for generated code 730. Generated code 730 may include code that may be utilized by a physical device. Parser 222 may provide the function call portion to textual engine 228, and textual engine 228 may process the function call portion to generate function call-based code for generated code 730. In example 700, TCE 220 may utilize the function-based code and the function call-based code to provide a first version of the graphical function (e.g., foo with the unsigned integer data type u_u8) in a first function of generated code 730. TCE 220 may utilize the function-based code and the function call-based code to provide a second version of the graphical function (e.g., foo with the double precision data type u_double) in a second function of generated code 730. TCE 220 may cause client device 210 to display generated code 730 to the user, to store generated code 730, and/or to embed generated code 730 in one or more physical devices.

Figure 7D:
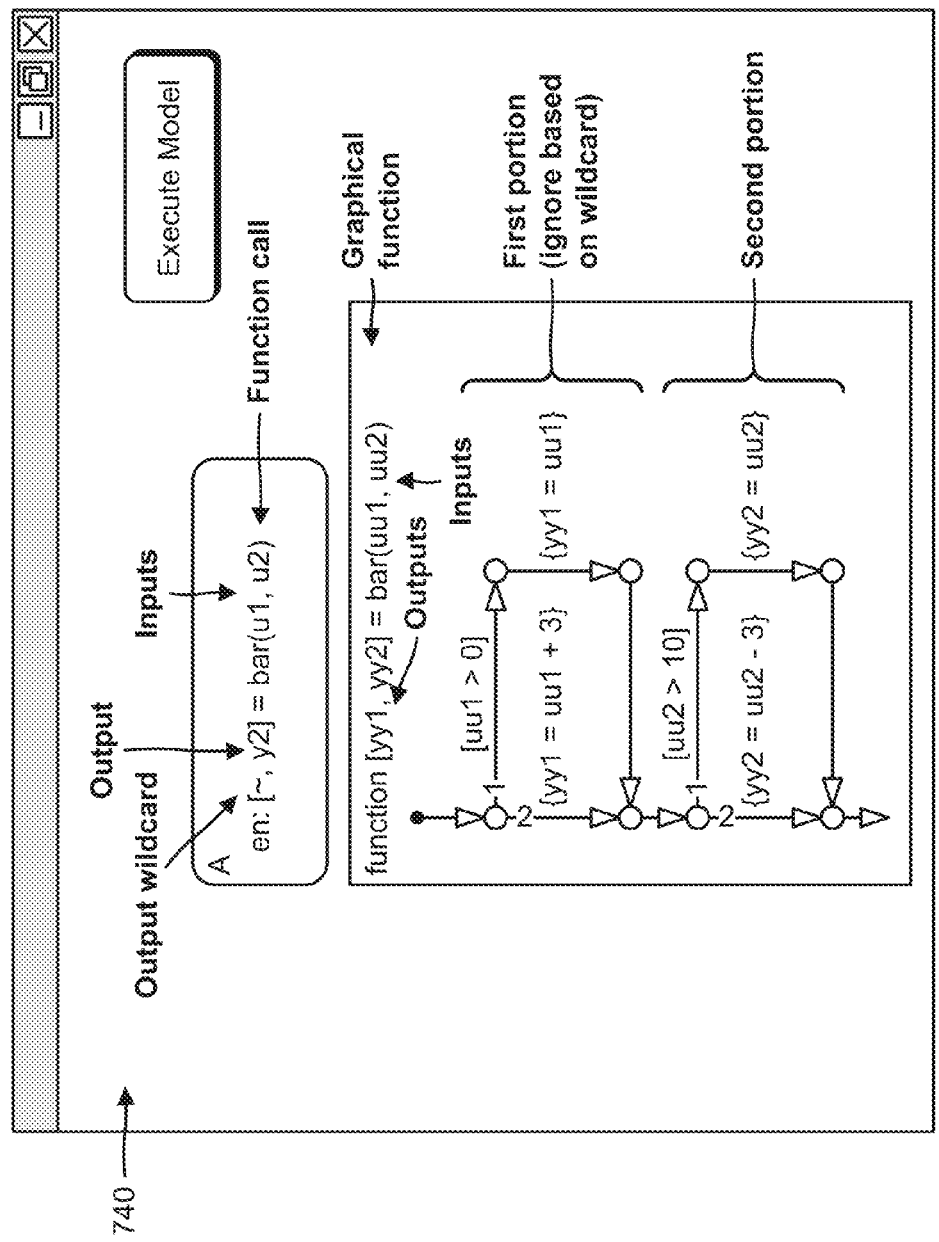

In example 700, now assume that the user utilizes TCE 220 to create another state chart or to import the state chart into TCE 220 and the model. For example, the user may select the state chart block of the model in user interface 710, and TCE 220 may display a user interface 740 that enables the user to create the elements of the state chart, as shown in FIG. 7D. As shown, TCE 220 may cause client device 210 to display the state chart as the user creates the state chart or after the user imports the state chart. In example 700, assume that the state chart includes a state block (e.g., state block A) and a function block. State block A may include a representation of calculations to be performed. As further shown in FIG. 7D, state block A may include a function call to a function bar (e.g., [~, y2]=bar(u1, u2)) with call inputs (u1 and u2), a call output wildcard (~) (e.g., a first call output), and a second call output (y2). The function call, the call inputs, the call output wildcard, and the second call output may be understood by textual engine 228 of TCE 220. In example 700, assume that placement of the call output wildcard indicates that the first call output is optional and may be ignored.

The function block may include a graphical function (e.g., [yy1, yy2]=bar(uu1, uu2)) with function inputs (uu1 and uu2) and function outputs (yy1 and yy2). The graphical function may include a first portion with paths for calculating yy1, such as, for example, a first path (e.g., yy1=uu1) when uu1 is greater than zero, and a second path (e.g., yy1=uu1+3) when uu1 is less than or equal to zero. The graphical function may include a second portion with paths for calculating yy2, such as, for example, a first path (e.g., yy2=uu2) when uu2 is greater than ten, and a second path (e.g., yy2=uu2-3) when uu2 is less than or equal to ten. The graphical function, the function inputs, and the function outputs may be understood by graphical engine 226 of TCE 220. In example 700, assume that placement of the call output wildcard indicates that the first portion of the graphical function may be ignored.

After creating or importing the state chart, assume that the user instructs TCE 220 to execute the model by entering an "execute model" command or by selecting an "execute model" button, as shown in FIG. 7D. TCE 220 may execute the model and the state chart based on the user's instruction. When the state chart is executed by TCE 220, state block A may execute the function call [~, y2]=bar(u1, u2), which may cause the graphical function block to execute the second portion with function input uu2 and function output yy2.

As shown in FIG. 7E, when executing the state chart, TCE 220 may provide chart information to parser 222 of TCE 220. The chart information may include, for example, information associated with the arrangement of state block A, information associated with the function call (e.g., [~, y2]=bar(u1, u2)), information associated with the graphical function (e.g., [yy1, yy2]=bar(uu1, uu2)), etc. Parser 222 may divide the chart information into a function portion and a function call portion. In example 700, assume that the function portion includes the syntax bar, yy1, yy2, uu1, and uu2, and that the function call portion includes the syntax bar, ~, y2, u1, and u2.

As further shown in FIG. 7E, parser 222 may provide the function portion to graphical engine 226, and graphical engine 226 may process the function portion to generate function-based code for generated code 750. Generated code 750 may include code that may be utilized by a physical device. Parser 222 may provide the function call portion to textual engine 228, and textual engine 228 may process the function call portion to generate function call-based code for generated code 750. TCE 220 may ignore the first portion of the graphical function since the first portion is associated with the first output variable yy1, which may be ignored based on the location of the call output wildcard in the function call. In example 700, TCE 220 may utilize the function-based code and the function call-based code to provide a version of the graphical function (e.g., bar with only the second portion of the graphical function) in a function of generated code 750. TCE 220 may cause client device 210 to display generated code 750 to the user, to store generated code 750, and/or to embed generated code 750 in one or more physical devices.

Figure 7F:
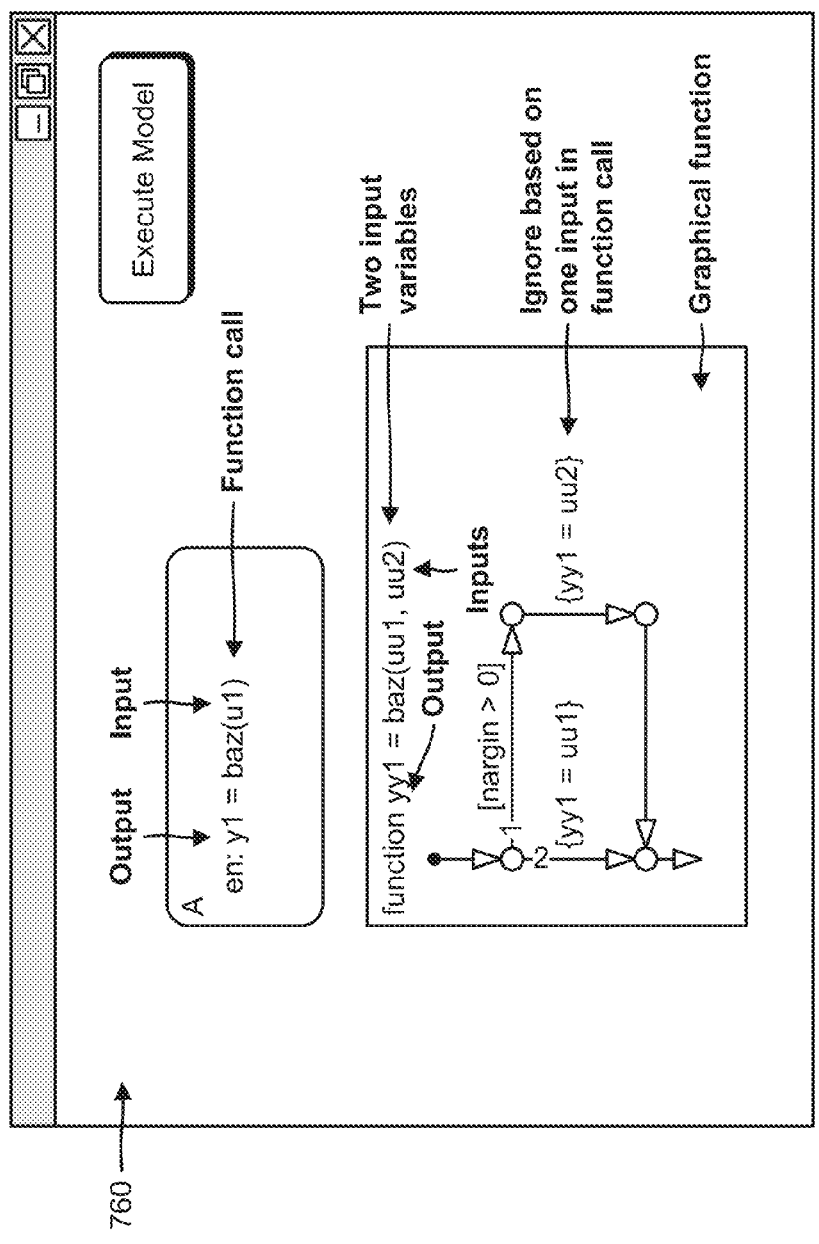

In example 700, now assume that the user utilizes TCE 220 to create still another state chart or to import the state chart into TCE 220 and the model. For example, the user may select the state chart block of the model in user interface 710, and TCE 220 may display a user interface 760 that enables the user to create the elements of the state chart, as shown in FIG. 7F. As shown, TCE 220 may cause client device 210 to display the state chart as the user creates the state chart or after the user imports the state chart. In example 700, assume that the state chart includes a state block (e.g., state block A) and a function block. State block A may include a representation of calculations to be performed. As further shown in FIG. 7F, state block A may include a function call to a function baz (e.g., y1=baz(u1)) with a call input (u1) and a call output (y1). The function call, the call input, and the call output may be understood by textual engine 228 of TCE 220.

The function block may include a graphical function (e.g., yy1=baz(uu1, uu2)) with function inputs (uu1 and uu2) and a function output (yy1). The graphical function may include paths for calculating yy1, such as, for example, a first path (e.g., yy1=uu2) when nargin (e.g., which may indicate either uu1 or uu2) is greater than zero, and a second path (e.g., yy1=uu1) when nargin is less than or equal to zero. The graphical function, the function inputs, and the function output may be understood by graphical engine 226 of TCE 220. In example 700, assume that TCE 220 ignores the second function input (uu2) of the graphical function since the function call only includes one call input (u1).

After creating or importing the state chart, assume that the user instructs TCE 220 to execute the model by entering an "execute model" command or by selecting an "execute model" button, as shown in FIG. 7F. TCE 220 may execute the model and the state chart based on the user's instruction. When the state chart is executed by TCE 220, state block A may execute the function call y1=baz(u1), which may cause the graphical function block to execute the second path with function input uu1 and function output yy1.

Figure 7G:
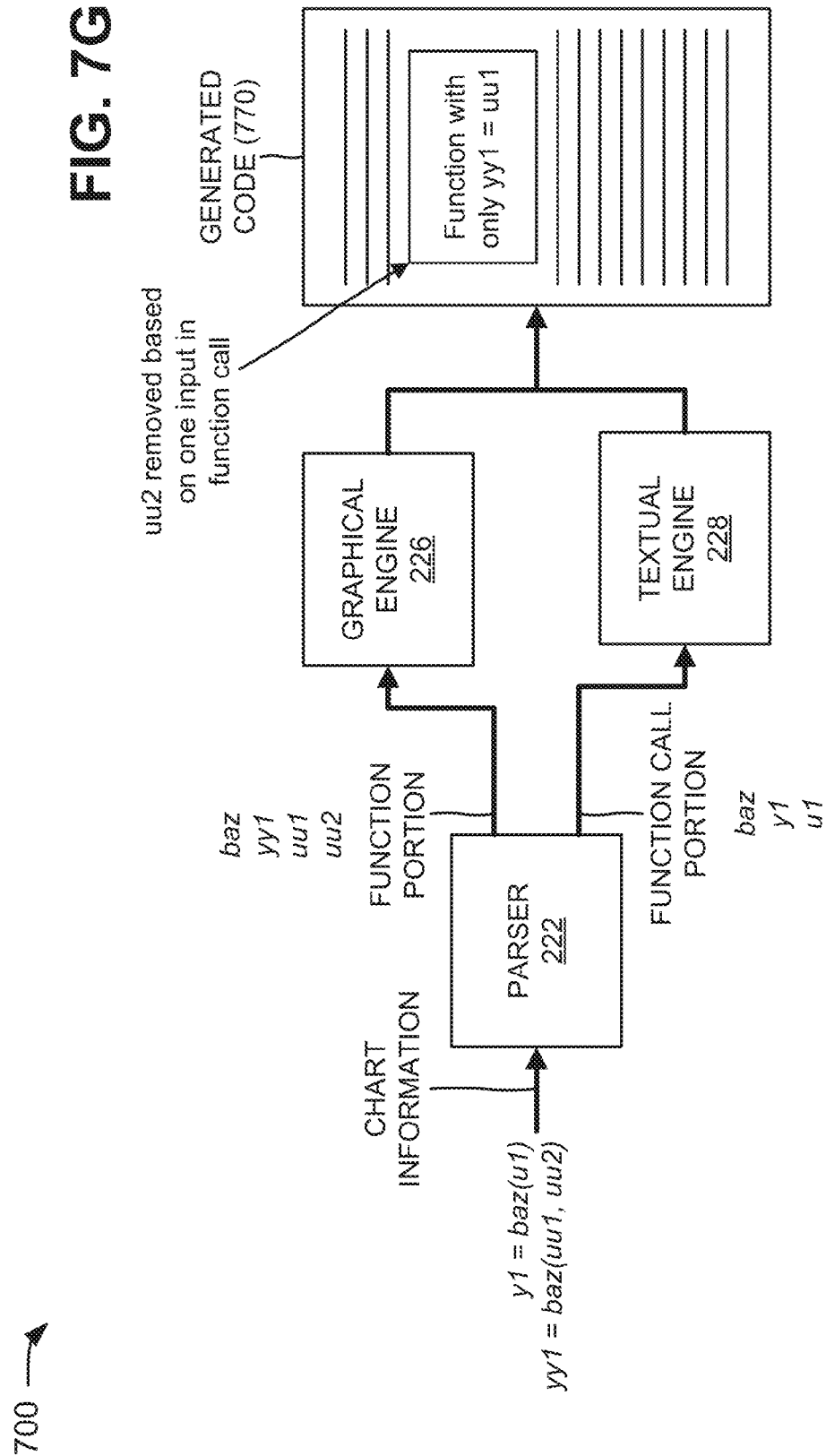

As shown in FIG. 7G, when executing the state chart, TCE 220 may provide chart information to parser 222 of TCE 220. The chart information may include, for example, information associated with the arrangement of state block A, information associated with the function call (e.g., y1=baz(u1)), information associated with the graphical function (e.g., yy1=baz(uu1, uu2)), etc. Parser 222 may divide the chart information into a function portion and a function call portion. In example 700, assume that the function portion includes the syntax baz, yy1, uu1, and uu2, and that the function call portion includes the syntax baz, y1, and u1.

As further shown in FIG. 7G, parser 222 may provide the function portion to graphical engine 226, and graphical engine 226 may process the function portion to generate function-based code for generated code 770. Generated code 770 may include code that may be utilized by a physical device. Parser 222 may provide the function call portion to textual engine 228, and textual engine 228 may process the function call portion to generate function call-based code for generated code 770. TCE 220 may ignore the second function input (uu2) of the graphical function since the function call only includes one call input (u1). In example 700, TCE 220 may utilize the function-based code and the function call-based code to provide a version of the function (e.g., baz with only the first function input (uu1) of the graphical function) in a function of generated code 770. TCE 220 may cause client device 210 to display generated code 770 to the user, to store generated code 770, and/or to embed generated code 770 in one or more physical devices.

As indicated above, FIGS. 7A-7G are provided merely as an example. Other examples are possible and may differ from what was described with regard to FIGS. 7A-7G.

Figure 8A:
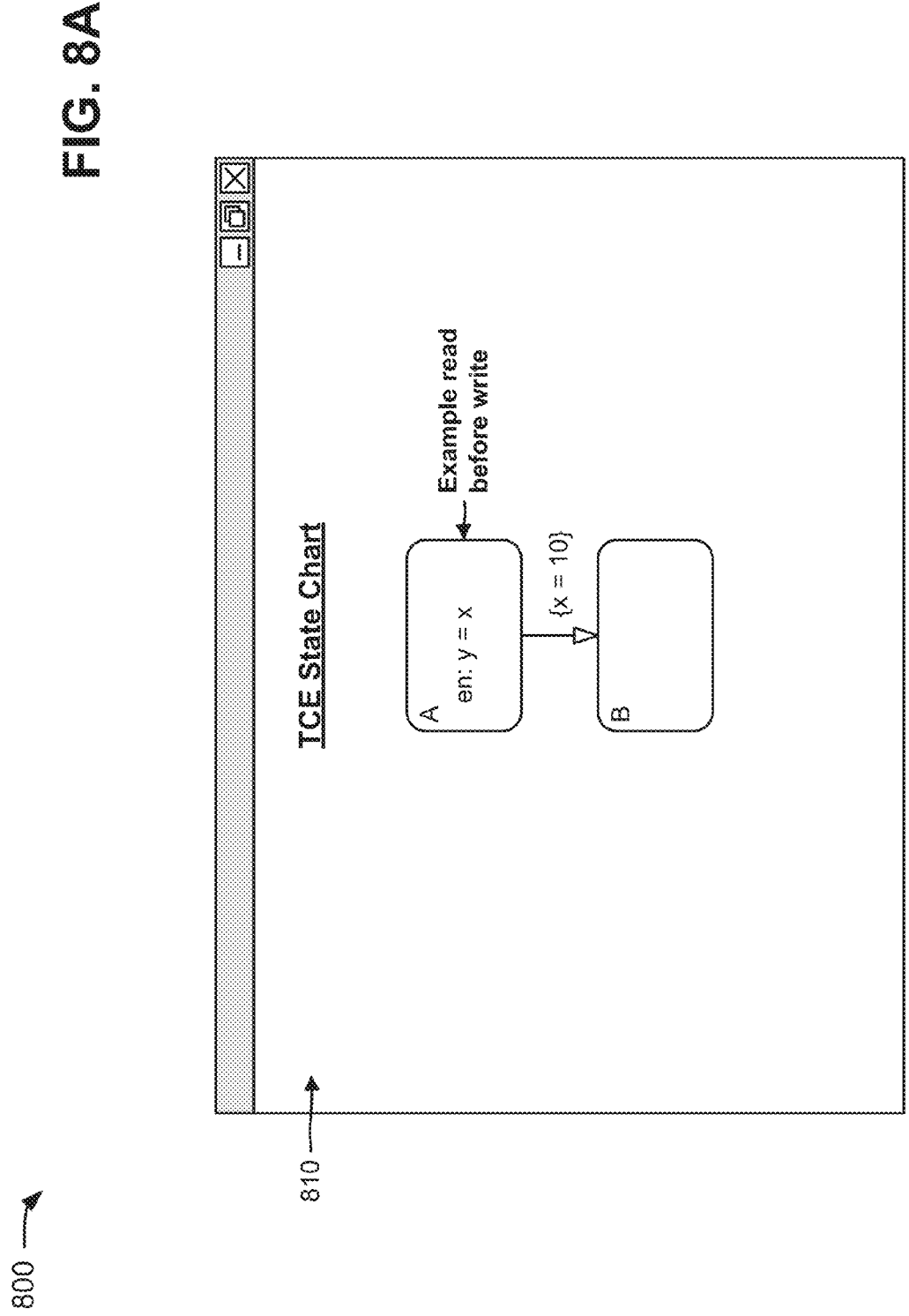
FIGS. 8A and 8B are diagrams of example diagnostics that check for data consistency.
Figure 8B:
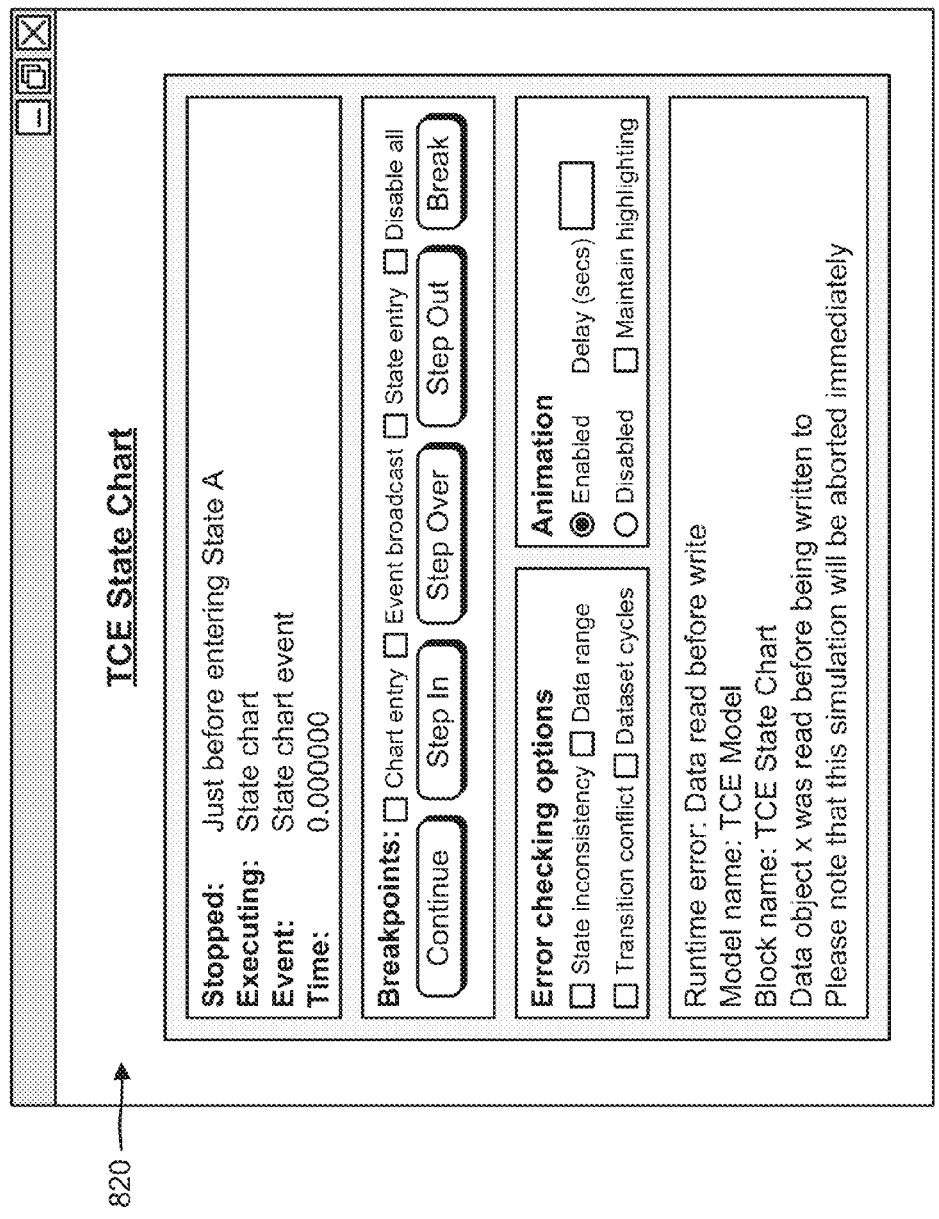

FIGS. 8A and 8B are diagrams of example diagnostics that check for data consistency. When a textual environment of TCE 220 is utilized in a graphical environment of TCE 220 it may be difficult for a user to determine when data is read and when data is written. In some implementations, data in TCE 220 should be written before being read. However, a user may create a state chart with TCE 220, such as the state chart shown in a user interface 810 of FIG. 8A, where data is read before being written. As shown, the state chart may include two state blocks (e.g., state block A and state block B) connected together with a transition. The transition may include textual code (e.g., x=10) that writes data to a variable (x). State block A may include textual code (e.g., y=x) that reads data for variable x. In this example, state block A may attempt to read data for variable x before data is written to variable x. This may cause an error to be generated during execution of the state chart or before execution of the state chart (e.g., based on a static analysis).

In some implementations, TCE 220 may generate and display a user interface 820 that enables the user to troubleshoot a read-before-write error, as shown in FIG. 8B. As shown, user interface 820 may include a section indicating that the state chart stopped just before entering state block A and before any execution time (e.g., 0.000000) has elapsed. User interface 820 may also include a breakpoints section that enables the user to set breakpoints for the state chart. A breakpoint may indicate a point at which TCE 220 halts execution of the state chart. For example, the user may set breakpoints upon chart entry, upon state entry, during an event broadcast, etc. In another example, if the user puts a breakpoint in a graphical function and various different functions are created, the breakpoints may be carried over into each of the different functions.

User interface 820 may include an error check section that enables the user to select error checking options for the state chart. For example, the user may elect to check for state inconsistency, transition conflict, etc. in the state chart. User interface 820 may include an animation section in which the user may enable or disable animation. User interface 820 may include a section indicating that a runtime error (e.g. data read before write) occurred in a block (e.g., TCE State Chart) of a model (e.g., TCE Model). The section may also indicate that the runtime error includes "data object x being read before being written to."

As indicated above, FIGS. 8A and 8B are provided merely as an example. Other examples are possible and may differ from what was described with regard to FIGS. 8A and 8B.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code is to be broadly interpreted to include text-based code that may be automatically executed (e.g., C code, C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving a state chart generated via a technical computing environment,
   the state chart including at least one function block that includes a function,
   the function including one or more function inputs and one or more function outputs,
   the state chart including at least one state block that includes a function call to the function of the at least one function block,
   the function call including one or more call inputs and one or more call outputs, and the receiving the state chart being performed by a
device;
initiating execution of the state chart,
the initiating the execution of the state chart being
performed by the device;
parsing, during the execution of the state chart, the
function into the one or more function inputs and the
one or more function outputs,
the parsing the function being performed by the device;
parsing, during the execution of the state chart, the
function call into the one or more call inputs and the
one or more call outputs,
the parsing the function call being performed by the
device;
transforming a portion of the function, which is not
understood by a graphical engine of the technical
computing environment, into a transformed portion of
the function that is understood by the graphical engine,
the transforming the portion of the function into the
transformed portion of the function including:
providing text included in the portion of the function
to a transformer, and
transforming, with the transformer, the text included
in the portion of the function so that the text is
understood by the graphical engine,
the text included in the portion of the function not
being understood by the graphical engine,
the transforming being performed by the device;
processing, during the execution of the state chart, the one
or more function inputs, the one or more function
outputs, and the transformed portion of the function
with the graphical engine of the technical computing
environment to generate function-related code,
the processing the one or more function inputs, the one
or more function outputs, and the transformed por-
tion of the function being performed by the device;
processing, during the execution of the state chart, the one
or more call inputs and the one or more call outputs
with a textual engine of the technical computing envi-
ronment to generate function call-related code,
the processing the one or more call inputs and the one
or more call outputs being performed by the device;
and
providing the function-related code and the function call-
related code in generated code,
the providing being performed by the device.

2. The method of claim 1, where the one or more call
inputs or the one or more call outputs include different data
types, and the method further comprises:
generating a second function for each of the different data
types; and
providing the generated second functions in the generated
code.

3. The method of claim 1, where at least one of the one
or more call outputs includes a call output wildcard, and the
method further comprises:
generating a second function that implements particular
function inputs, of the one or more function outputs,
that do not correspond to the call output wildcard; and
providing the second function in the generated code.

4. The method of claim 3, where the call output wildcard
includes one or more of:
an alphabetical character or characters,
a numeric character or characters, or
alphanumeric characters.

5. The method of claim 1, where a number of the one or
more function inputs is greater than a number of the one or
more call inputs, and the method further comprises:
generating a second function that includes a particular
number of the one or more function inputs,
the particular number being equal to the number of the
one or more call inputs; and
providing the second function in the generated code.

6. The method of claim 1, where the state chart is provided
in a model generated via the technical computing environ-
ment.

7. The method of claim 1, further comprising:
outputting the generated code;
storing the generated code; or
embedding the generated code in a physical device.

8. A device, comprising:
one or more processors to:
receive a state chart generated via a technical comput-
ing environment,
the state chart including at least one function block
that includes a function,
the function including one or more function inputs
and one or more function outputs, and
the state chart including at least one state block that
includes a function call to the function of the at
least one function block,
the function call including one or more call inputs
and one or more call outputs,
receive an instruction to initiate execution of the state
chart,
initiate execution of the state chart based on the instruc-
tion,
parse, during the execution of the state chart, the
function into the one or more function inputs and the
one or more function outputs,
parse, during the execution of the state chart, the
function call into the one or more call inputs and the
one or more call outputs,
transform a portion of the function, which is not
understood by a graphical engine of the technical
computing environment, into a transformed portion
of the function that is understood by the graphical
engine,
the one or more processors, when transforming the
portion of the function into the transformed portion
of the function, being to:
provide text included in the portion of the function to
a transformer, and
transform, with the transformer, the text included in
the portion of the function so that the text is
understood by the graphical engine,
the text included in the portion of the function not
being understood by the graphical engine,
process, during the execution of the state chart, the one
or more function inputs, the one or more function
outputs, and the transformed portion of the function
with the graphical engine of the technical computing
environment to generate function-related code,
process, during the execution of the state chart, the one
or more call inputs and the one or more call outputs
with a textual engine of the technical computing
environment to generate call-related code,
provide the function-related code and the call-related
code in generated code, and
output the generated code.

9. The device of claim 8, where the one or more call inputs or the one or more call outputs include different data types, and the one or more processors are further to:
generate a second function for each of the different data types, and
provide the generated second functions in the generated code.

10. The device of claim 8, where at least one of the one or more call outputs includes a call output wildcard, and the one or more processors are further to:
generate a second function that implements particular function inputs, of the one or more function outputs, that do not correspond to the call output wildcard, and
provide the second function in the generated code.

11. The device of claim 10, where the call output wildcard includes one or more of:
an alphabetical character or characters,
a numeric character or characters, or
alphanumeric characters.

12. The device of claim 8, where a number of the one or more function inputs is greater than a number of the one or more call inputs, and the one or more processors are further to:
generate a second function that includes a particular number of the one or more function inputs,
the particular number being equal to the number of the one or more call inputs, and
provide the second function in the generated code.

13. The device of claim 8, where the state chart is provided in a model generated via the technical computing environment.

14. The device of claim 8, where the one or more processors are further to one or more of:
provide the generated code for display,
store the generated code, or
embed the generated code in a physical device.

15. A non-transitory computer-readable medium storing instructions, the instructions comprising:
one or more instructions that, when executed by one or more processors, cause the one or more processors to:
receive a state chart generated via a technical computing environment,
the state chart including at least one function block that includes a function,
the function including one or more function inputs and one or more function outputs, and
the state chart including at least one state block that includes a function call to the function of the at least one function block,
the function call including one or more call inputs and one or more call outputs,
initiate execution of the state chart,
parse, during the execution of the state chart, the function into the one or more function inputs and the one or more function outputs,
parse, during the execution of the state chart, the function call into the one or more call inputs and the one or more call outputs,
transform a portion of the function, which is not understood by a graphical engine of the technical computing environment, into a transformed portion of the function that is understood by the graphical engine,
the one or more instructions, that cause the one or more processors to transform the portion of the function into the transformed portion of the function, cause the one or more processors to:
provide text included in the portion of the function to a transformer, and
transform, with the transformer, the text included in the portion of the function so that the text is understood by the graphical engine,
the text included in the portion of the function not being understood by the graphical engine,
process, during the execution of the state chart, the one or more function inputs, the one or more function outputs, and the transformed portion of the function with the graphical engine of the technical computing environment to generate function-related code,
process, during the execution of the state chart, the one or more call inputs and the one or more call outputs with a textual engine of the technical computing environment to generate call-related code,
provide the function-related code and the call-related code in generated code, and
output the generated code.

16. The non-transitory computer-readable medium of claim 15, where the one or more call inputs or the one or more call outputs include different data types, and the instructions further comprise:
one or more instructions that, when executed by the one or more processors, cause the one or more processors to:
generate a second function for each of the different data types, and
provide the generated second function in the generated code.

17. The non-transitory computer-readable medium of claim 15, where at least one of the one or more call outputs includes a call output wildcard, and the instructions further comprise:
one or more instructions that, when executed by the one or more processors, cause the one or more processors to:
generate a second function that implements particular function inputs, of the one or more function outputs, that do not correspond to the call output wildcard, and
provide the second function in the generated code.

18. The non-transitory computer-readable medium of claim 17, where the call output wildcard includes one or more of:
an alphabetical character or characters,
a numeric character or characters, or
alphanumeric characters.

19. The non-transitory computer-readable medium of claim 15, where a number of the one or more function inputs is greater than a number of the one or more call inputs, and the instructions further comprise:
one or more instructions that, when executed by the one or more processors, cause the one or more processors to:
generate a second function that includes a particular number of the one or more function inputs,
the particular number being equal to the number of the one or more call inputs, and
provide the second function in the generated code.

20. The non-transitory computer-readable medium of claim 15, the instructions further comprising:
 one or more instructions that, when executed by the one or more processors, cause the one or more processors to one or more of:
  provide the generated code for display,
  store the generated code, or
  embed the generated code in a physical device.

* * * * *